US005694506A

United States Patent [19]
Kobayashi et al.

[11] Patent Number: 5,694,506
[45] Date of Patent: Dec. 2, 1997

[54] OPTICAL CONNECTOR

[75] Inventors: Masaru Kobayashi; Shin'ichi Iwano; Ryo Nagase; Seiko Mitachi; Yoshiaki Takeuchi; Shuichiro Asakawa, all of Ibarakiken, Japan

[73] Assignee: Nippon Telegraph and Telephone Corporation, Tokyo, Japan

[21] Appl. No.: 613,470

[22] Filed: Mar. 11, 1996

[30] Foreign Application Priority Data

| Mar. 9, 1995 | [JP] | Japan | 7-050200 |
| Jun. 19, 1995 | [JP] | Japan | 7-151537 |
| Jun. 21, 1995 | [JP] | Japan | 7-154965 |
| Oct. 6, 1995 | [JP] | Japan | 7-260213 |

[51] Int. Cl.⁶ ............................ G02B 6/00; G02B 6/36
[52] U.S. Cl. ............................................... 385/60
[58] Field of Search ......................... 385/60, 24, 38, 385/30, 42, 43, 59, 81, 53, 92, 116, 121, 147

[56] References Cited

U.S. PATENT DOCUMENTS

| 3,644,922 | 2/1972 | James et al. | 385/116 |
| 4,984,865 | 1/1991 | Lee et al. | 385/53 |
| 5,305,406 | 4/1994 | Rondeau | 385/81 |
| 5,400,421 | 3/1995 | Takahashi | 385/24 |
| 5,485,537 | 1/1996 | Jeong et al. | 385/60 |

Primary Examiner—Akm E. Ullah
Attorney, Agent, or Firm—Banner & Witcoff, Ltd.

[57] ABSTRACT

When plug is fitted to adapter, optical fiber is inserted to an alignment hole for the optical fiber. By providing a taper at the entrance thereof, even if the tip of the optical fiber is deviated from the central position, the deviation is absorbed to make it possible for the optical fiber to be inserted smoothly. When two plugs is fitted to adapter, the tip of one optical fiber is confronted with the other one in the alignment hole, and excessive length $L_1-L_2$ is pushed into the two optical fiber-bending spaces with a suitable distribution, thus the optical fiber buckles therein. The end face of the optical fiber is subjected to flat surface-polishing, removal of ripples after being cleaved, or chamfer grinding after being cleaved. The buckling portion of the optical fiber is coated with carbon or the like.

42 Claims, 27 Drawing Sheets

CLEAVING

RIPPLE GRINDING

CHAMFER GRINDING

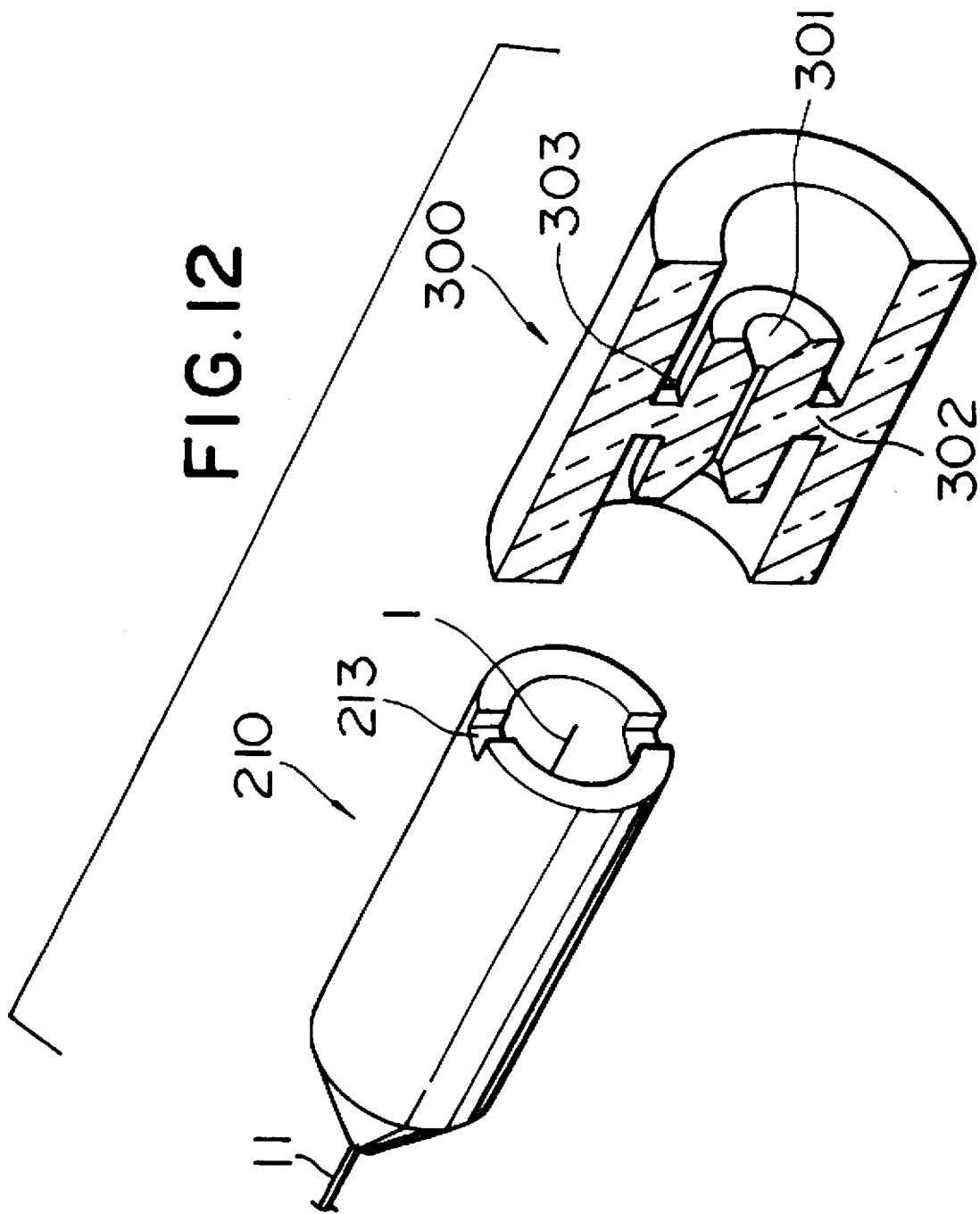

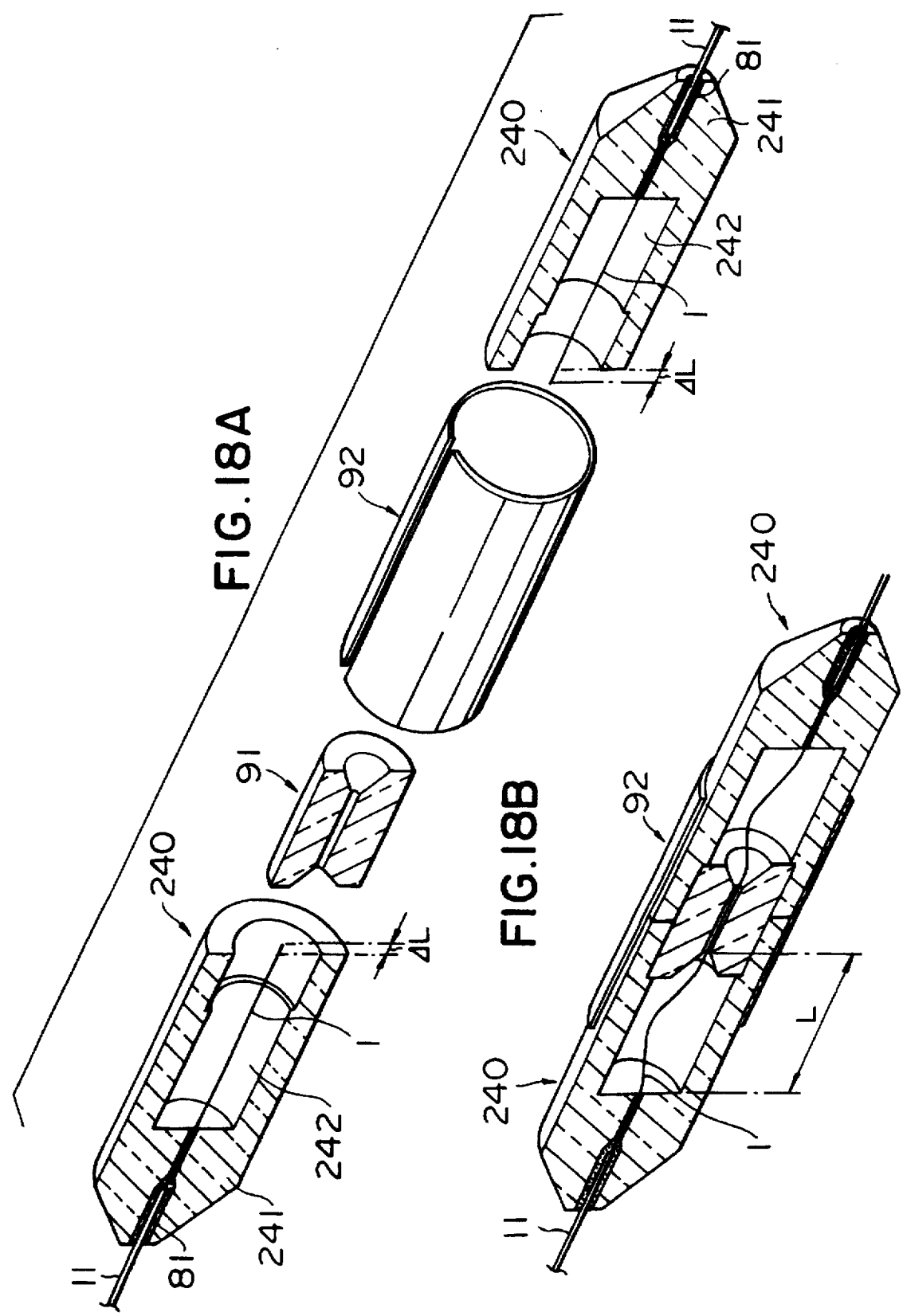

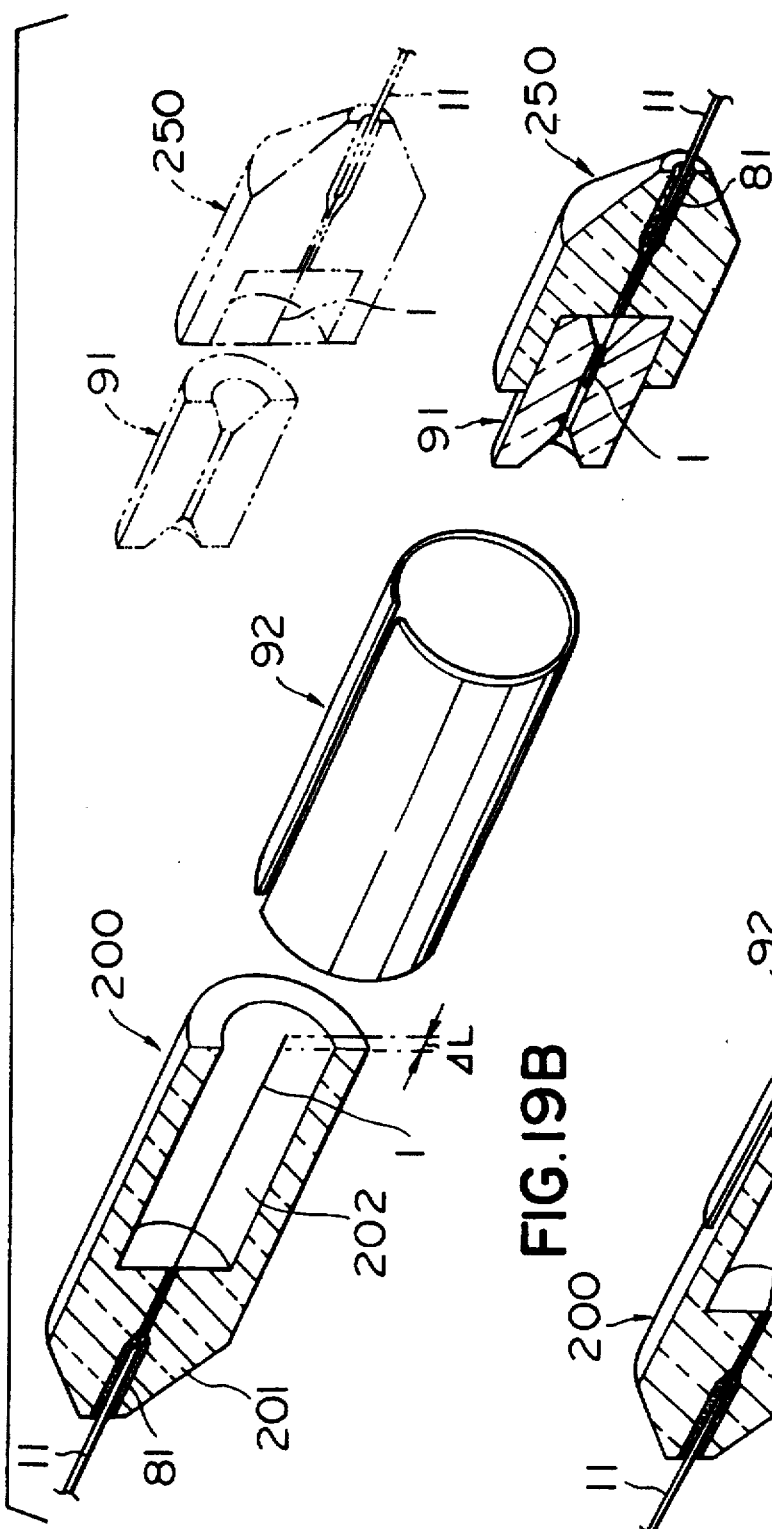

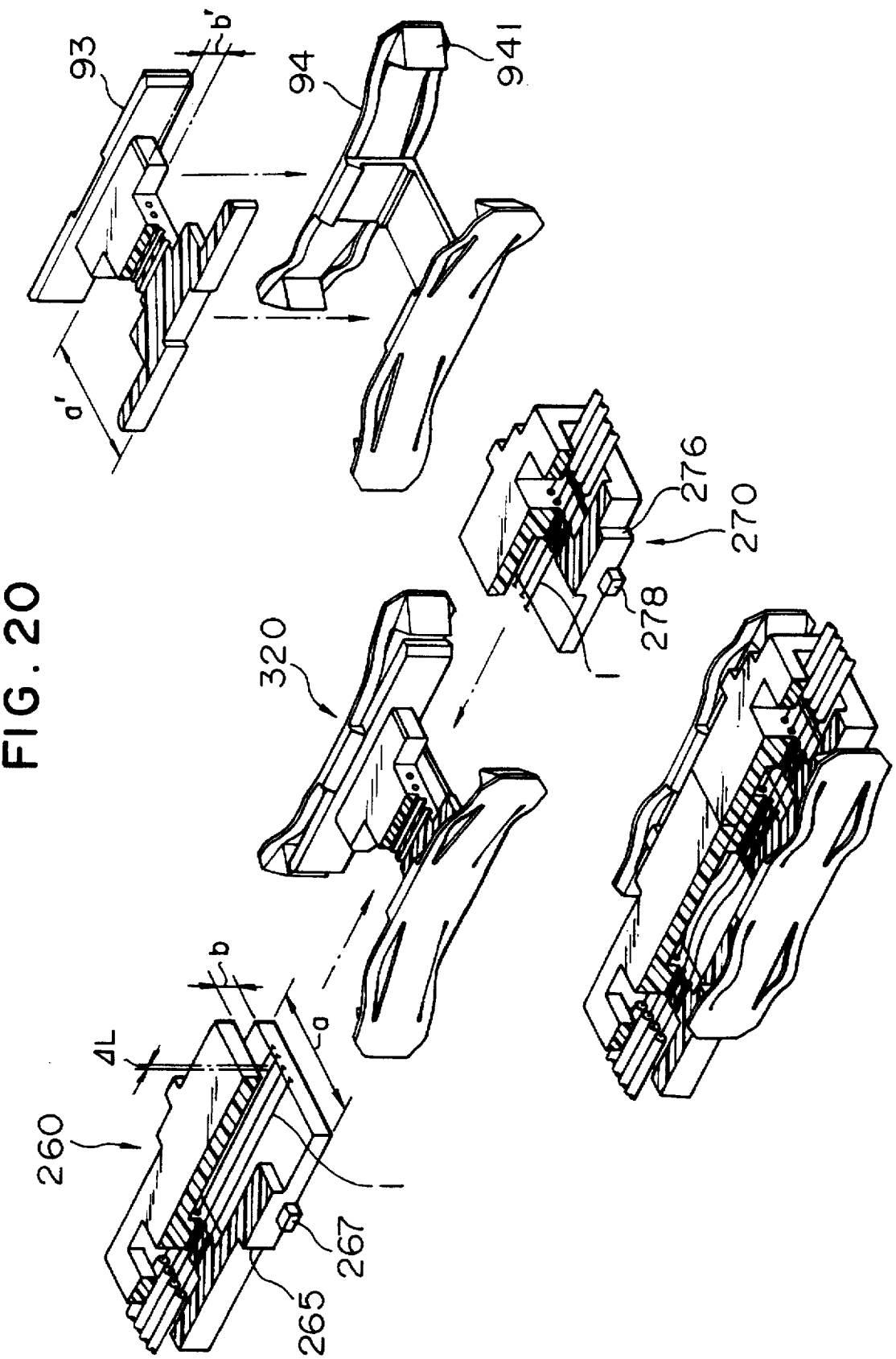

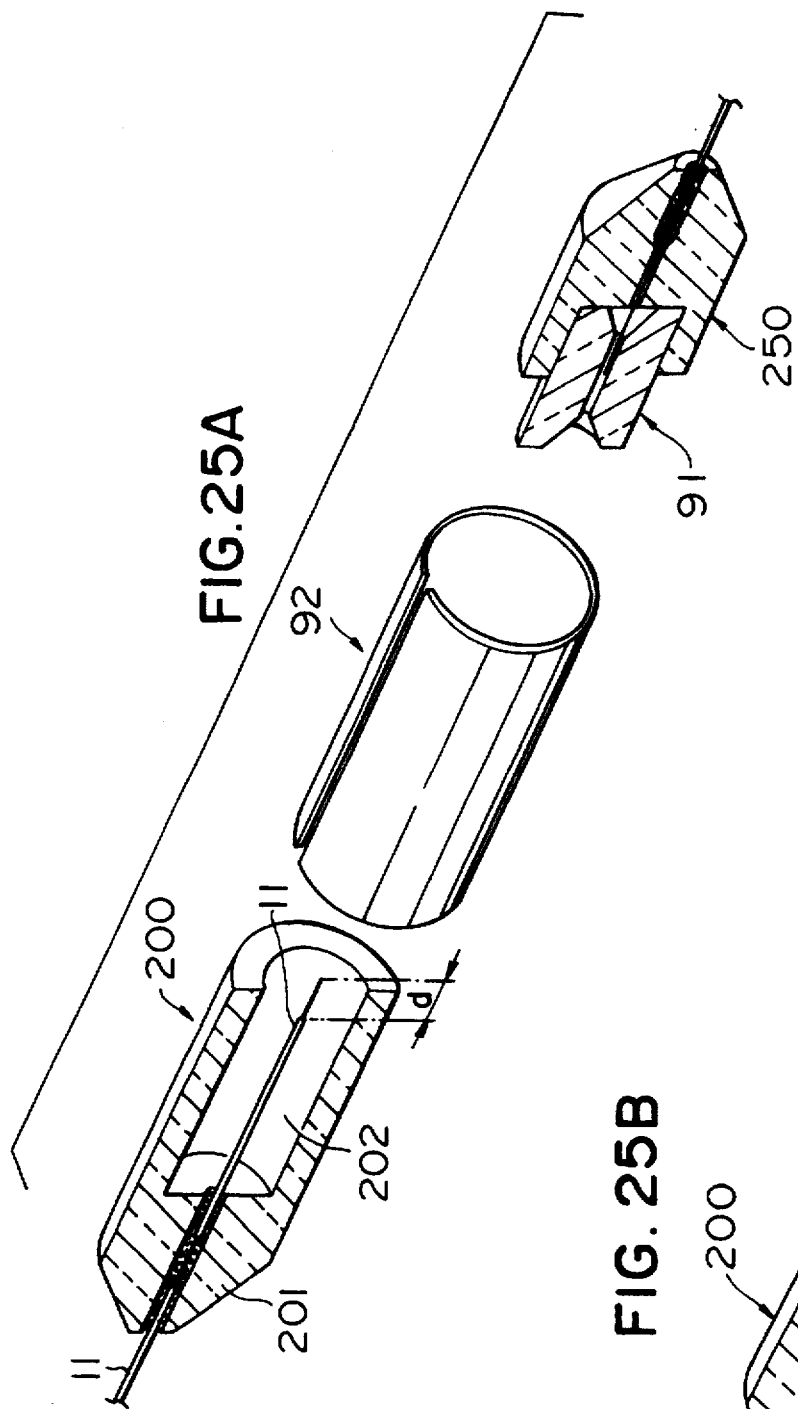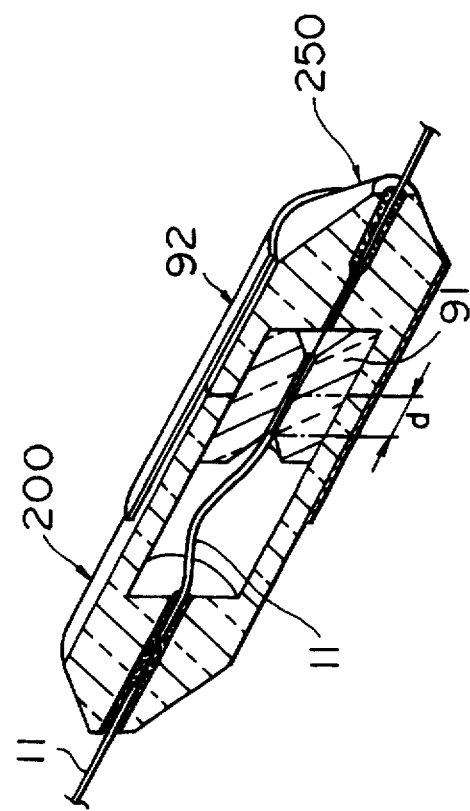

OPTICAL CONNECTOR

BACKGROUND OF THE INVENTION

1. Technical Field of the Invention

The present invention relates to a detachable optical connector for connecting optical fibers, or optical fiber and optical waveguide with PC (Physical Contact) connection.

2. Prior Art

As a conventional art in this technical field, there is the one described in Japanese Laid-Open Patent Publication No. Sho 52-155548. The optical fiber connector described in this literature is composed of a plug and an adapter. The plug has a cavity and holds optical fibers. The adapter has a sleeve for optical fibers in the center thereof. When the plug is fitted to the adapter, the optical fiber is inserted into the sleeve. At this time, since the length of optical fiber from the spot to be held to the tip thereof is set to be somewhat long, when the corresponding optical fiber is put opposite thereto, the optical fiber will bend in the cavity remaining in the plug. If the length is set properly so long as the length of optical fiber from the spot to be held to the tip thereof is set to be somewhat long, the end face thereof can be brought close to each other easily and securely, since the excessive length is absorbed in this bending portion. Furthermore, by bringing the inner diameter of the fiber sleeve close to the outer diameter of the optical fiber, the miss alignment of axis between optical fibers can be made small, thereby the insertion loss can be reduced.

However, this optical fiber connector has problems described below. In this optical fiber connector, the end faces are used directly as cleaved surface for connection. Since optical fibers are buckled in the bending portion, buckling force is generated, thereby the connected faces can be pushed. In the cleaved surface, however, there exist ripples in the micron order, and a large pushing force is necessary to crush them elastically and bring them into intimate contact with each other. Therefore, the end faces are not brought into contact with each other with the force which is generated by buckling of optical fibers, and low reflection characteristic cannot be obtained.

Furthermore, if the excessive length of optical fibers is not set to about 0.1 mm for bending, the curvature of optical fibers at the bending portion becomes large, and radiation loss of propagation light becomes large, moreover there may be breaking if large load is applied to the bending portion (which will be described later in detail in the embodiment of the present invention). In general, the machining precision in the lengthwise direction of members is from 0.1 mm to 0.05 mm. Therefore, if a connector is composed of plural members as in this optical fiber connector, the dimensional precision of the connector becomes not less than 0.1 mm, thus it is impossible to set the excessive length of optical fibers to about 0.1 mm for bending. Thereby, the insertion loss may be increased, or the optical characteristics become unstable when the connector is used repeatedly or the temperature change is large.

On the other hand, conventionally there is a MU-type optical fiber connector which is one of PC optical fibers, as shown in FIG. 1. This MU-type optical fiber connector is composed of optical fiber 1000, plug 2000, adapter 3000 containing sleeve 5000, and ferrule 9000. In this connector, considering the problems of the optical fiber connector described above, the end face of fiber is polished, and when optical fiber 1000 is fixed in the ferrule 9000 in the plug 2000, the end faces are pushed by a spring 4000 having a large stroke, thereby the end faces are securely brought into intimate contact with each other, thus PC connection can be realized. This connector is currently the main stream of optical fiber connectors.

Specifically, optical fiber 1000 is reinforced by being adhered and fixed to the center of ferrule made of zirconia having a diameter of $\phi 1.25$ mm so that it can endure the polishing work, and end face thereof is polished to the convex curved surface. The close contact (PC connection) of tips of optical fibers are realized by putting two ferrule tips opposite to each other via a sleeve having a diameter of $\phi 1.25$ mm, and pushing both ends by springs. As a result, excellent optical characteristics such as the average insertion loss of 0.1 dB, and the average return loss of 50 dB can be obtained.

In this optical fiber connector, however, there are following problems. In this optical fiber connector, it is necessary to fix optical fiber 1000 to the ferrule 9000 in order to reinforce optical fiber 1000. Furthermore, at this time, it is necessary to locate optical fiber 1000 in the center of ferrule 9000 and to enhance the outer diameter precision of ferrule 9000 and the inner diameter precision of the sleeve 5000 as far as possible. If this requirement is not satisfied, the miss alignment of optical axis of optical fiber 1000 becomes large to increase the insertion loss. Moreover, since the outer diameter of ferrule 9000 is ten times as large as the outer diameter of optical fiber 1000 (0.125 mm), it is required to crush elastically the tip of ferrule to some extent so as to bring tips of optical fiber 1000 into intimate contact with each other securely. Accordingly, it has been necessary to make the end face of optical fiber in a convex curved shape, and push it with a load as large as about 10N (about 1 kgf) by a spring 4000.

As described above, in this optical fiber connector, number of members becomes large since ferrule and spring are necessary, and some capacity is required, thereby there has been a limitation to make the number of members small and to make the whole size small. Also, high dimensional precision of members such as ferrule and the like is required and it has been difficult to decrease the cost thereof. Furthermore, since the required pushing force is large, when multiple optical fiber connectors are attached/detached together as in the input/output section of the optical package of an optical communication apparatus, quite large force is required.

SUMMARY OF THE INVENTION

Under this background, the present invention has been completed, and the object of the present invention is to provide a small optical connector having excellent optical characteristics and small number of members.

In order to attain the above object, the present invention provides an optical connector comprising: two plugs having a cavity with one end being opened, and holding an optical fiber with the end face being shaped as a cantilever at the other end thereof, respectively; and, an alignment member having an alignment hole in the center in the radial direction, and to which the respective optical fibers are inserted from both directions when the two respective plugs are fitted from both directions of the alignment hole; wherein, respective tips of two optical fibers related to the two plugs being press-contacted in said alignment hole, and the both two optical fibers, or either of them buckling in the cavity.

In this case, the buckling is caused because the relationship of the length of the two optical fibers are such that respective tips of the two optical fibers abut against each other before the two plugs and the alignment member are fitted to the predetermined final position.

The present invention provides an optical connector comprising: a plug having a cavity with one end being opened, and holding an optical fiber with the end face being shaped as a cantilever at the other end thereof; and, a jack having an alignment member at one end having an alignment hole in the center in the radial direction, and holding at the other end an optical fiber with the end face being shaped so that the tip thereof is located in the alignment hole; wherein, the optical fiber related to the plug being inserted into the alignment hole and press-contacted by the optical fiber related to the jack when the plug is fitted to the jack, and the optical fiber related to the plug buckling in the cavity.

In this case, the buckling is caused because the relationship between the length of the optical fiber related to the plug and the length of the optical fiber related to the jack are such that respective tips of the two optical fibers abut against each other before the plug and the jack are fitted to the predetermined final position.

The present invention provides an optical connector comprising: a plug having a cavity with one end being opened, and holding an optical fiber with the end face being shaped as a cantilever at the other end thereof; and, a jack having an alignment member at one end having an alignment hole in the center in the radial direction, having a cavity with both ends being closed inside of the alignment member, and holding at the other end an optical fiber with the end face being shaped so that the optical fiber is inserted through the cavity as well as the tip thereof is located in the alignment hole; wherein, the optical fiber related to the plug being inserted into the alignment hole and press-contacted by the optical fiber related to the jack when the plug is fitted to the jack, and both optical fiber related to the plug and optical fiber related to the jack or either one of them buckling in the respective cavities.

In this case, the buckling is caused because the relationship between the length of the optical fiber related to the plug and the length of the optical fiber related to the jack are such that respective tips of the two optical fibers abut against each other before the plug and the jack are fitted to the predetermined final position.

The present invention provides an optical connector comprising: a plug having a cavity with one end being opened, and holding an optical fiber with the end face being shaped as a cantilever at the other end thereof; and, a jack having an alignment member at one end having an alignment hole in the center in the radial direction, and holding at the other end an optical waveguide so that the end face thereof abuts against the alignment hole; wherein, the optical fiber being inserted into the alignment hole and press-contacted by the end face of the optical waveguide when the plug is fitted to said jack, and the optical fiber related to the plug buckling in the cavity.

In this case, the buckling is caused because the relationship between the length of the optical fiber related to the plug and the length of the optical waveguide related to the jack are such that the tip of the optical fiber abuts against the end face of the optical waveguide before the plug and the jack are fitted to the predetermined final position.

The present invention provides an optical connector comprising: two plugs having a cavity with one end being opened, and holding an optical fiber with the end face being shaped as a cantilever at the other end thereof, respectively; and, an adapter having alignment members having an alignment hole in the center in the radial direction, respectively at both ends, having a cavity inside of the two alignment members, and holding an optical fiber with the end face being shaped so that the optical fiber is inserted through the cavity as well as both ends thereof are located in respective alignment holes of the two alignment members; wherein, respective optical fibers related to the two plugs being inserted into the respective alignment holes and press-contacted by the optical fiber related to the adapter when the two plugs are fitted from both directions of the adapter, and the optical fiber related to the adapter buckling in the cavity.

In this case, the buckling is caused because the relationship of the length of the three optical fibers are such that respective tips of the two optical fibers related to the two plugs abut against the optical fiber related to the adapter, before the two plugs and the adapter are fitted to the predetermined final position.

In the above-mentioned invention, once buckling is caused in the optical fiber, the end faces of optical fibers or optical fiber and optical waveguide are pushed with a certain pressure. Therefore, by adjusting the pressure, optical connection with small insertion loss and large return loss can be realized.

In the preferred embodiment of the present invention, the end face of the optical fiber is flat surface-polished.

In the preferred embodiment of the present invention, ripples of the cleaved surface of the optical fiber is removed.

In the preferred embodiment of the present invention, the cleaved surface of the optical fiber is chamfered.

By the above-mentioned end-face processing, the optical connection characteristic is improved.

In the preferred embodiment of the present invention, a taper is provided in the entrance portion of the alignment hole.

According to this embodiment, even if there is much or less miss alignment at the tips of optical fibers, they are inserted smoothly into the alignment hole.

In the preferred embodiment of the present invention, it includes an alignment hole through which the optical fiber is inserted, and also has an alignment member slidable in the cavity of the plug, and an elastic member which pushes the alignment member and locates it to the tip portion of the plug in the steady state.

According to this embodiment, the alignability of the optical fiber is improved, and the taper may not be provided at the entrance portion of the alignment hole, or it may be at least very small.

In the preferred embodiment of the present invention, it includes plural optical fibers and alignment holes.

According to this embodiment, plural optical connections can be favorably realized.

In the preferred embodiment of the present invention, the coating on the optical fiber portion related to the buckling is left.

In the preferred embodiment of the present invention, the portion related to buckling of the optical fiber is coated with carbon.

In the preferred embodiment of the present invention, the portion related to buckling of the optical fiber is coated with a metal film formed by nonelectrode plating.

In the preferred embodiment of the present invention, the portion related to buckling of the optical fiber is coated with an oxide film of an organometallic compound formed by heating a hydrolyric film of an organometallic compound.

In the preferred embodiment of the present invention, the portion related to buckling of the optical fiber is coated with an oxide film of an organometallic compound formed by heating a sprayed organometallic compound.

In the preferred embodiment of the present invention, the portion related to buckling of the optical fiber is coated with an oxide film of an organometallic compound formed by the liquid-phase deposition.

According to the afore-mentioned plural embodiments, the optical fiber related to the buckling portion is reinforced.

In the preferred embodiment of the present invention, plug, alignment member, jack and adapter are fixed by a fixing member.

According to this embodiment, fitting is secured.

The nature, principle and utility of the invention will become more apparent from the following detailed description when read in conjunction with the accompanying drawings.

BRIEF DESCRIPTION OF THE DRAWINGS

In the accompanying drawings:

FIG. 12 is a partially sectional perspective view showing the structure of the 5th embodiment in the optical connector of the present invention.

FIGS. 18A and 18B are perspective views showing the structure of the 9th embodiment in the optical connector of the present invention.

FIGS. 19A and 19B are perspective views showing the structure of the 10th embodiment in the optical connector of the present invention.

FIG. 20 is a perspective view showing the structure of the 11th embodiment in the optical connector of the present invention.

FIGS. 25A and 25B are views showing the structure of the 16th embodiment in the optical connector of the present invention.

DESCRIPTION OF THE PREFERRED EMBODIMENTS

Embodiments of the present invention will now be described in detail with reference to the accompanying drawings.

Figure 1:
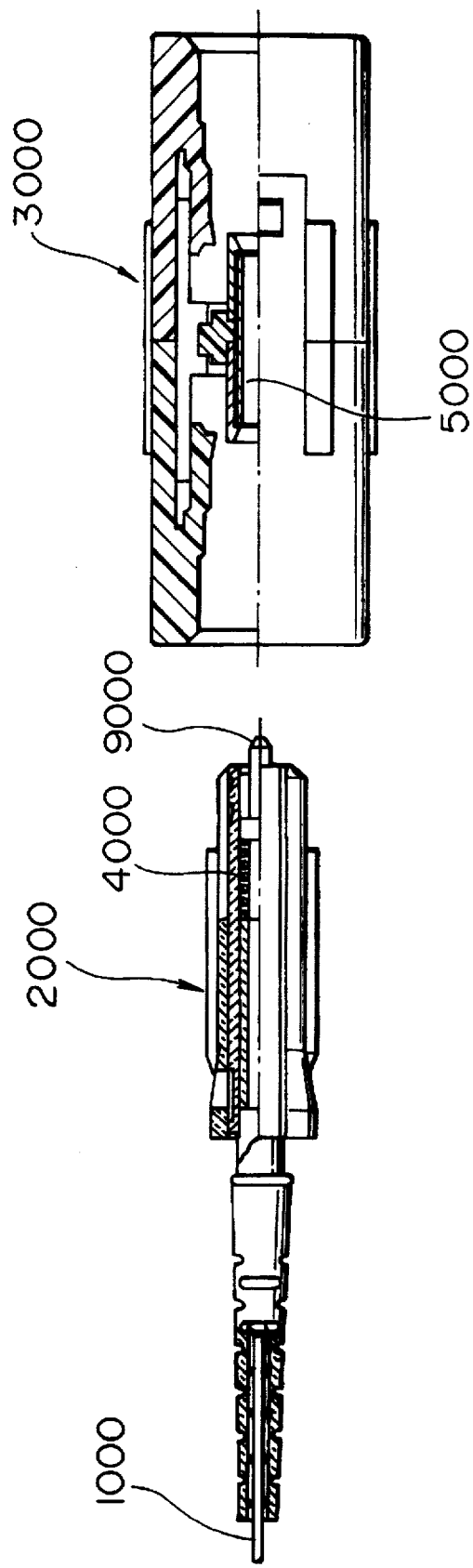
FIG. 1 is a perspective view of a conventional MU-type fiber connector.
Figure 2:
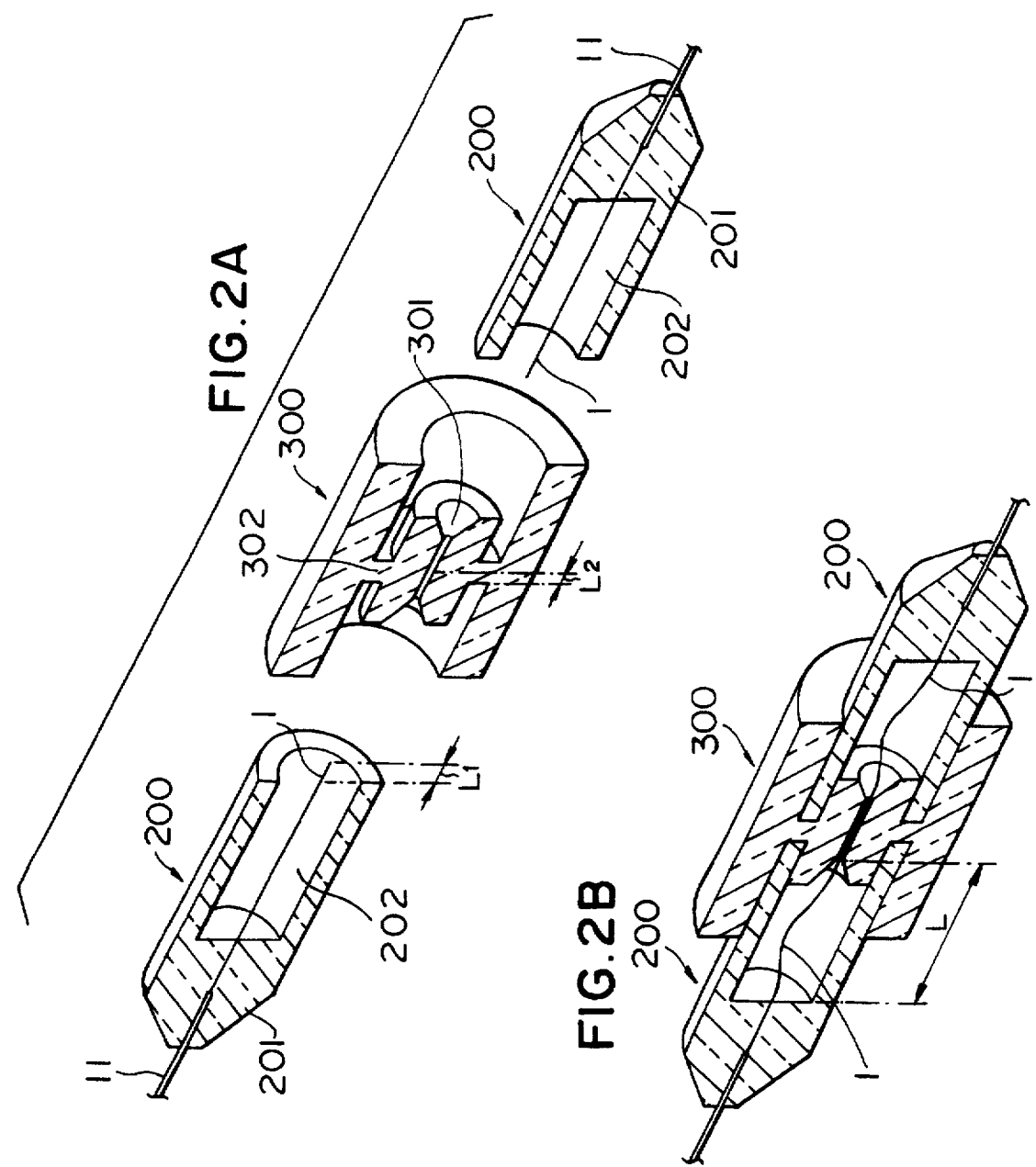
FIGS. 2A and 2B are sectional perspective views showing the structure of the first embodiment in the optical connector of the present invention.

FIGS. 2A and 2B are sectional perspective views showing the structure of the first embodiment in the optical connector of the present invention, and particularly, FIG. 2A shows the structure before being fitted, and FIG. 2B shows the structure after being fitted. Referring to these drawings, reference numeral 1 represents an optical fiber, 11 represents a coating of the optical fiber, 200 represents a plug, 201 represents an optical fiber-holding portion, 202 represents an optical fiber-bending space, 300 represents an adapter, 301 represents an alignment hole for the optical fiber, 302 represents a supporting portion of the alignment hole. The dimensions in the drawing are such that L shows the length of buckling portion, $L_1$ shows the protruding length of the optical fiber from plug 200, $L_2$ shows the distance from the center of adapter 300 to the face which plug 200 in the alignment hole-supporting portion runs against. Plug 200 has the optical fiber-bending space 202, and is fixed by an adhesive or the like at the holding portion 201 so that optical fiber 1 becomes the cantilever at the optical fiber-bending space 202. At the time of fitting, the tip of plug 2 is put against the side face of supporting portion 302 of the alignment hole. Optical fiber 1 protrudes from the tip of plug 200 by $L_1$, and the protruding length $L_1$ is set to be larger than the distance $L_2$ from the center of adapter 300 to the face which plug 200 in the alignment hole-supporting portion runs against. Namely, $L_1 - L_2 > 0$.

When plug 200 is fitted to adapter 300, optical fiber 1 is inserted to the alignment hole 301 for optical fibers. By providing a taper at the entrance thereof, even if the tip of optical fiber 1 is diverged from the central position, the divergence is absorbed and the optical fiber can be smoothly inserted. When two plugs 200 are fitted to adapter 300, the tip of one optical fiber 1 is put opposite to the other one in the alignment hole, and excessive length $L_1$–$L_2$ is pushed into the two optical fiber-bending spaces 202 by a suitable distribution.

Figure 3:
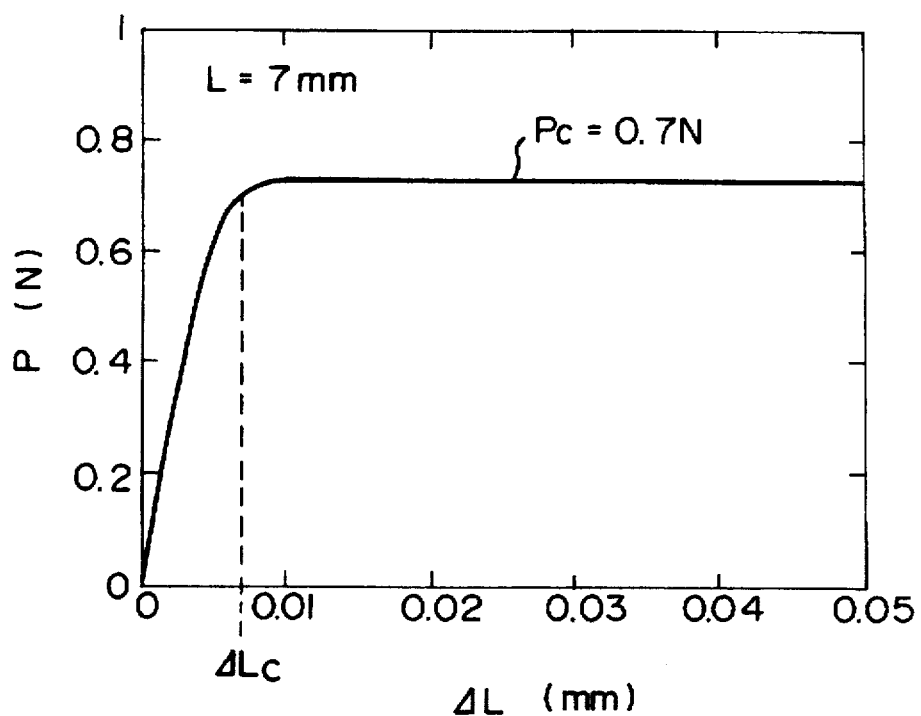
FIG. 3 is a view showing the relationship between the compressive force and the shrinkage of optical fiber.

FIG. 3 is a view showing the relationship between the compressive force and the shrinkage of optical fiber 1. Here, L shows the buckling length of respective optical fibers 1, $\Delta L$ shows the shrinkage of respective optical fibers, and P shows the compressive force required for pushing them.

As shown in FIG. 3, in the region where $\Delta L$ is small, optical fiber 1 is elastically compressed, thereby P increases in proportion to $\Delta L$, and once optical fiber is buckled, even if $\Delta L$ is changed, P does not change (the ultimate value $P_c$ when P does not change is referred to as the buckling force). Namely, when optical fiber 1 is buckled, even if $\Delta L$ takes any value, a certain pushing force is applied to the connected end faces of optical fibers 1.

According to the method utilizing this buckling, a spring means for pushing optical fibers is not required, as well as the pushing force does not increase in proportion to the shrinkage, unlike in the case of a spring means, thus a stable pushing mechanism can be obtained.

Herein, the buckling force $P_c$ is expressed by following equations (1) and (2), and in the buckling region, it is determined only by the length L of the buckling portion, and is constant without depending upon the shrinkage $\Delta L$:

$$P_c = \frac{4\pi^2 EI}{L^2} \quad (1)$$

$$I = \frac{\pi}{64} d^4 \quad (2)$$

Therefore, it is not necessary to particularly prescribe the distribution thereof. In addition, the boundary value $\Delta L_c$ between the linearly compressed region and the buckling region is expressed by the equation (3):

$$\Delta L_c = \frac{\pi^2 d^2}{4L} \quad (3)$$

Wherein, E represents the Young's modulus of the optical fiber, I represents the moment of inertia of the cross section, and d represents the outer diameter. In the case of general glass optical fiber, E=76 GPa, and d=125 µm, and in the case of L=7 mm, P=0.7N (70 gf), and $\Delta L_c$=6 µm. Therefore, if $L_1$–$L_2$ ($\Delta L$) is set to be 6 µm or larger in this case, buckling is caused without fail. When there is some difference at a level of machining precision in L of two plugs to cause a difference in the buckling force of two optical fibers, and two protruding lengths are pushed into a plug having smaller buckling force, only this side of optical fiber will buckle. However, this state will not cause any problem, and this buckling force is applied to the connecting face as a pushing force. In addition, even if difference is caused in the buckling force, when the force is balanced in the axial direction by the friction force and the like between the optical fiber and the alignment hole, both optical fibers will buckle.

Figure 4:
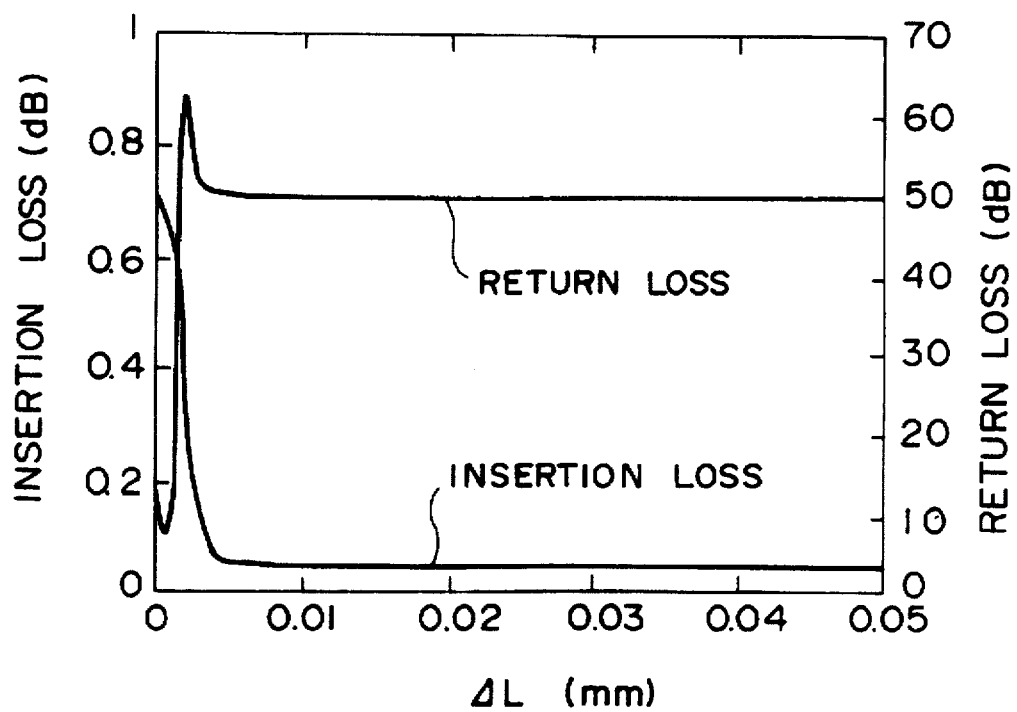
FIG. 4 is a view showing the relationship between the shrinkage and insertion loss, return loss of the optical fiber.

In addition, respective end faces of two optical fibers 1 are flat surface-polished so as to improve the contact degree. Namely, for example, diamond grain liquid having a particle diameter of 1 µm is used to surface-polish the connecting end face of optical fibers on a flat polishing plate. The relationship between the shrinkage and insertion loss, return loss of the optical fiber at this time is shown in FIG. 4, wherein the insertion loss and the return loss of the optical fiber connecting portion is shown in the ordinate and the shrinkage $\Delta L$ is shown in the abscissa, assuming that the buckling length L of the optical fiber 1 is 7 mm. In this case, the optical characteristics such as the insertion loss of 0.05 dB and the return loss of 50 dB could be obtained. In addition, the minimum pushing force to make the PC connection effective is a value as small as 0.4N (about 40 gf).

Thus, if it is flat surface-polished, the connecting end faces are uniformly press-contacted when the connecting end faces of respective optical fibers 1 are connected opposite to each other, and the roughness of the whole connecting end face is elastically crashed to be intimately contacted with each other with a small pushing force. Furthermore, surface-polishing has a large mass productivity, thereby the cost reduction can be attained.

Figure 5A:
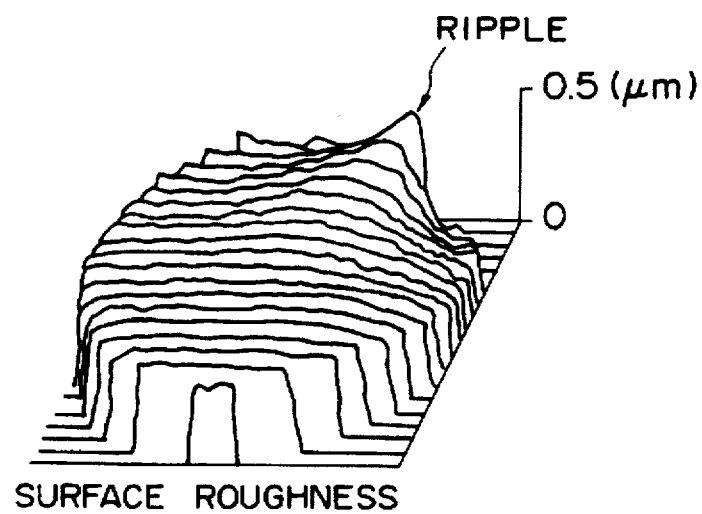
FIGS. 5A, 5B and 5C are views illustrating the shapes of the end face of the optical fiber.
Figure 5B:
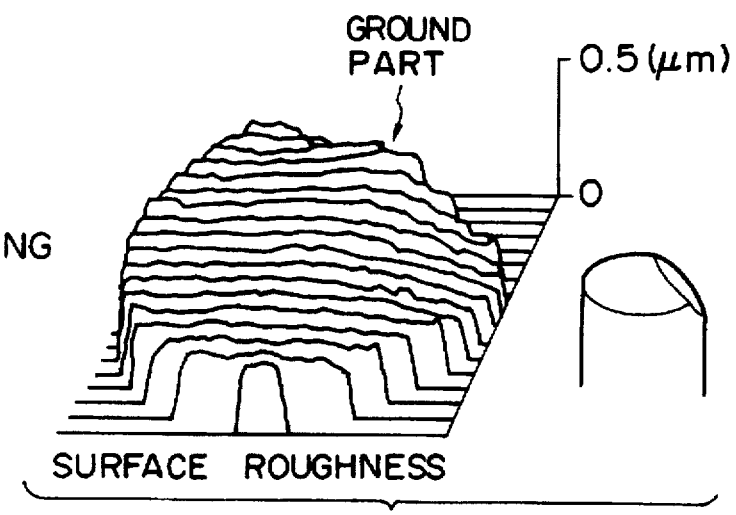

Also, in the case that the optical fiber is cleaved in order to form the connecting end face of the optical fiber, as shown in FIG. 5, the central portion of the optical fiber 1 is flat, and in the periphery thereof, ripples are caused generally in a height of several µms. Therefore, in this case, as shown in FIG. 5B, these ripples are ground to be removed, and the cleaved surface in the central portion of the optical fiber 1 is exposed. Thereby, the connecting end face is composed of a cleaved surface having good reflection characteristic, thereby excellent optical characteristics such as the insertion loss of 0.05 dB and the return loss of 60 dB can be obtained.

Figure 5C:
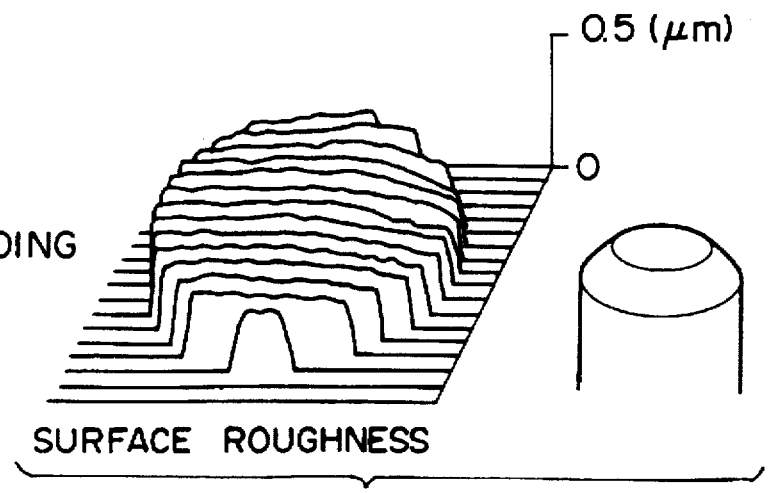
Figure 6A:
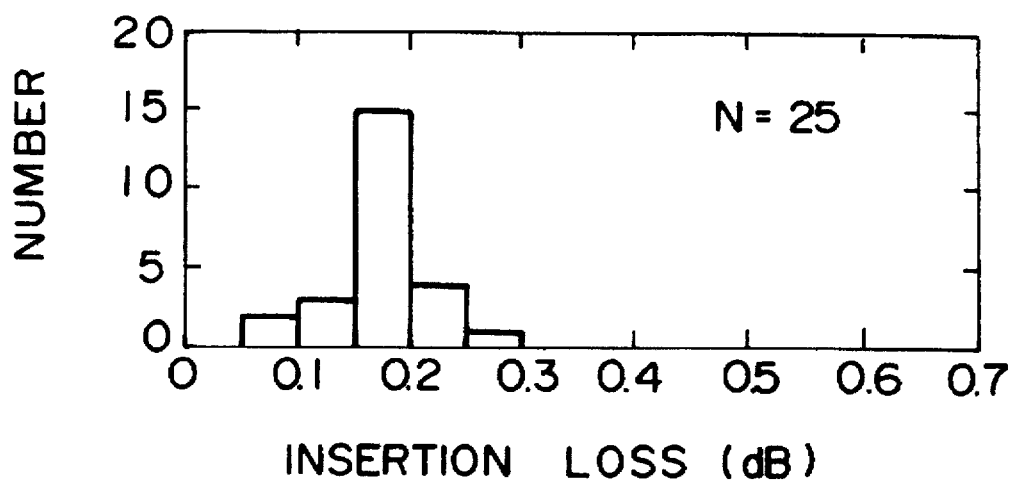
FIGS. 6A and 6B are histograms showing the measurement results of insertion loss and return loss, when 25 trial connections are performed with regard to the chamfered optical fiber.
Figure 6B:
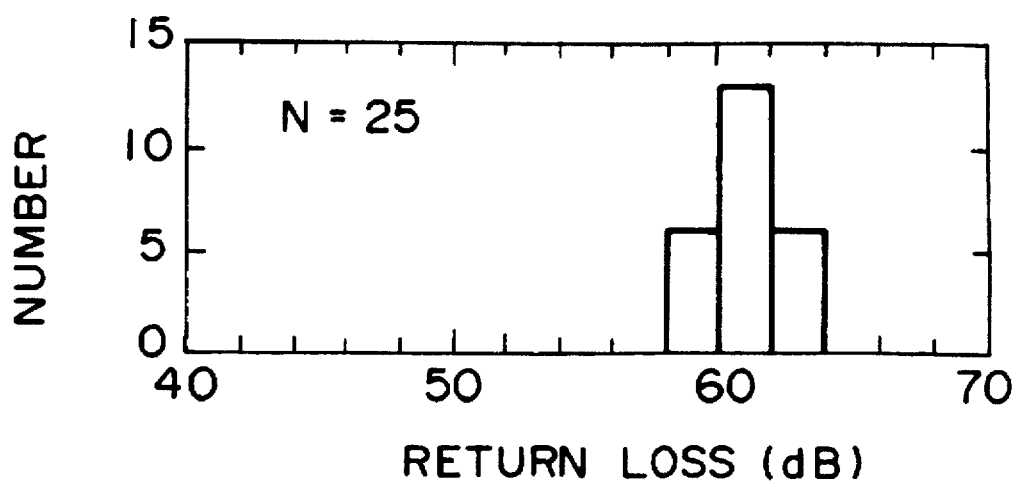

Furthermore, as shown in FIG. 5C, if chamfer grinding is performed after cleaving, the return loss becomes 60 dB or larger. In addition, in this case, since the cross section decreases, the required pushing force is also decreased, as well as the insertion into the alignment hole becomes easy. There is also an advantage in that it is not necessary to measure the position of ripples. In FIGS. 6A and 6B, there are shown histograms of the measurement results of the insertion loss and the return loss, when 25 trial connections are conducted with regard to the chamfered optical fiber. FIG. 6A shows the result of the insertion loss and FIG. 6B shows the result of the return loss. According to these data, the average insertion loss is 0.165 dB, and the average return loss is 60.7 dB.

Incidentally, if $L_1$–$L_2$ ($\Delta L$) is excessively increased, the radius of curvature of the buckling portion becomes small, and the bending loss is generated. Furthermore, if the optical fiber is buckled further, it may be broken. Accordingly, the value of $\Delta L$ cannot be made extremely large. However, this problem will be solved by the coating technique described later.

Furthermore, the above-mentioned relation of $L_1$ and $L_2$ is not limited thereto, and the length of two optical fibers may be in the relation such that respective tips of two optical fibers abut against each other before two plugs and the alignment member are fitted to the predetermined final position.

Figure 7A:
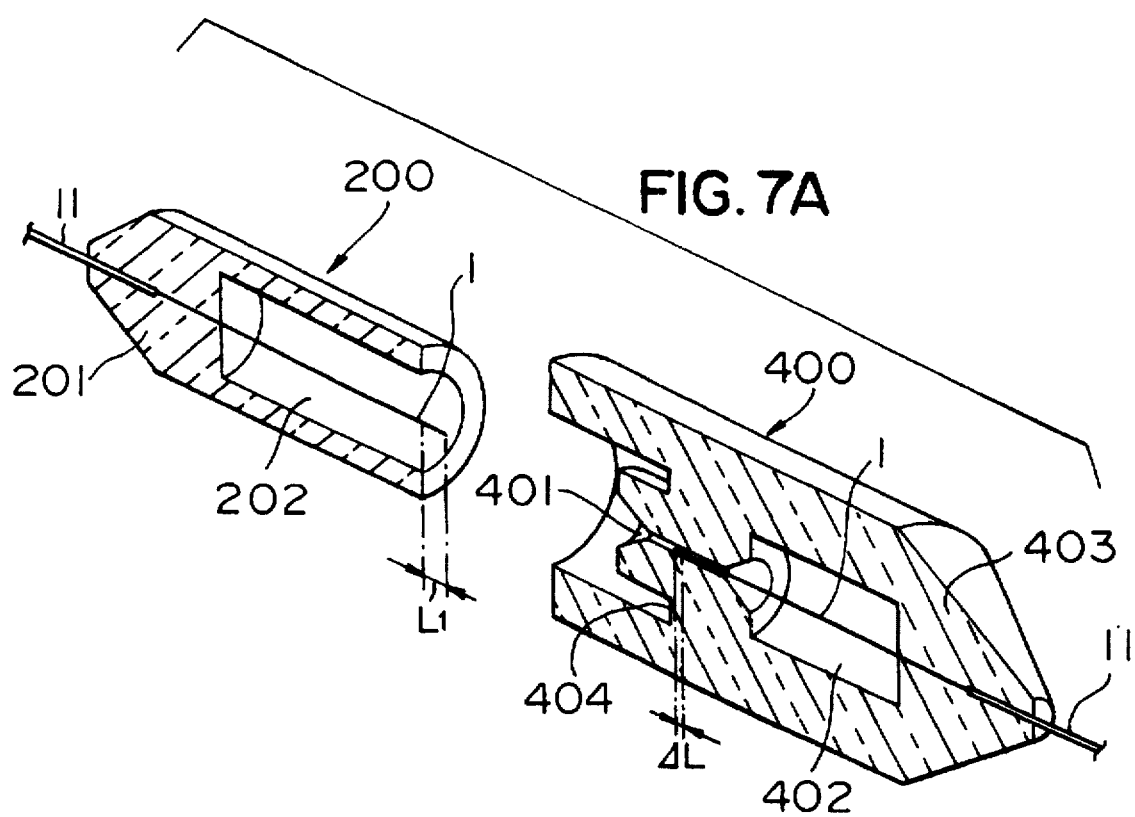
FIGS. 7A and 7B are sectional perspective views showing the structure of the second embodiment in the optical connector of the present invention.
Figure 7B:
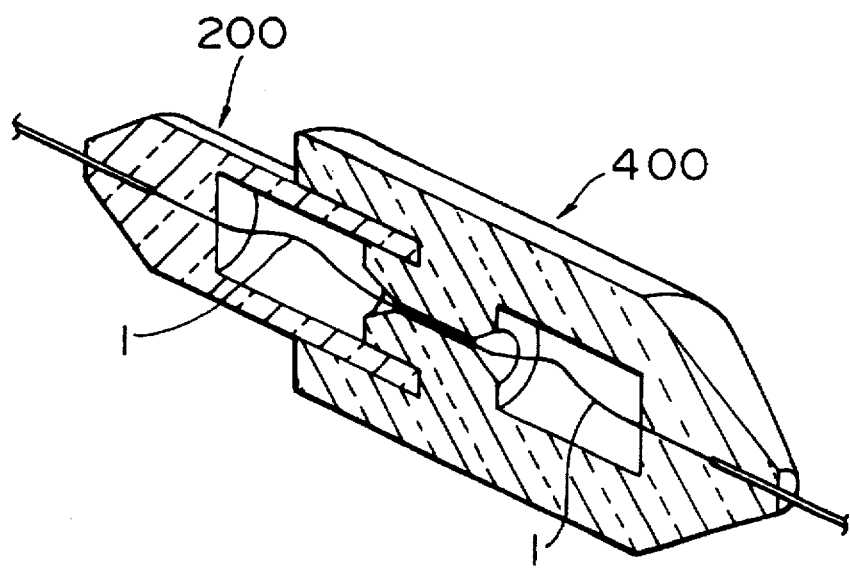

FIGS. 7A and 7B are sectional perspective views showing the structure of the second embodiment in the optical connector of the present invention. Particularly, FIG. 7A shows the structure before fitting of the plug and the jack, and FIG. 7B shows the structure after fitting thereof. In these figures, reference numeral 1 represents an optical fiber, 11 represents a coating of the optical fiber, 200 represents a plug, 201 represents an optical fiber-holding portion, 202 represents an optical fiber-bending space, 400 represents a jack, 401 represents an alignment hole for the optical fiber, 402 represents an optical fiber-bending space, 403 represents an optical fiber-holding portion, and 404 represents a plug-confronting face. The optical fiber 1 protrudes from plug 200 by $L_1$ as in the first embodiment.

Jack 400 is a type to buckle the optical fiber in the optical fiber-bending space 402 within the jack, and has a structure that one plug 200 in FIG. 2A and an adapter 300 are integrated. The optical fiber 1 related to jack 400 is fixed in the optical fiber-holding portion 403 in the state that it protrudes from the center of the alignment hole 401 to the plug fitting side by $L_1-L_2$ ($\Delta L$) in the alignment hole 401. With this structure, when plug 200 and jack 400 are fitted, two optical fibers 1 are connected in the alignment hole 401, as explained in the first embodiment, and the connecting face is pushed by the respective buckling forces to obtain the optical connection.

Also in this embodiment, the relation of $L_1$ and $L_2$ is not limited thereto, and the lengthwise relation of the optical fiber related to the plug and the optical fiber related to the jack may be such that respective tips of two optical fibers abut against each other before the plug and the jack are fitted to the predetermined final position.

Figure 8A:
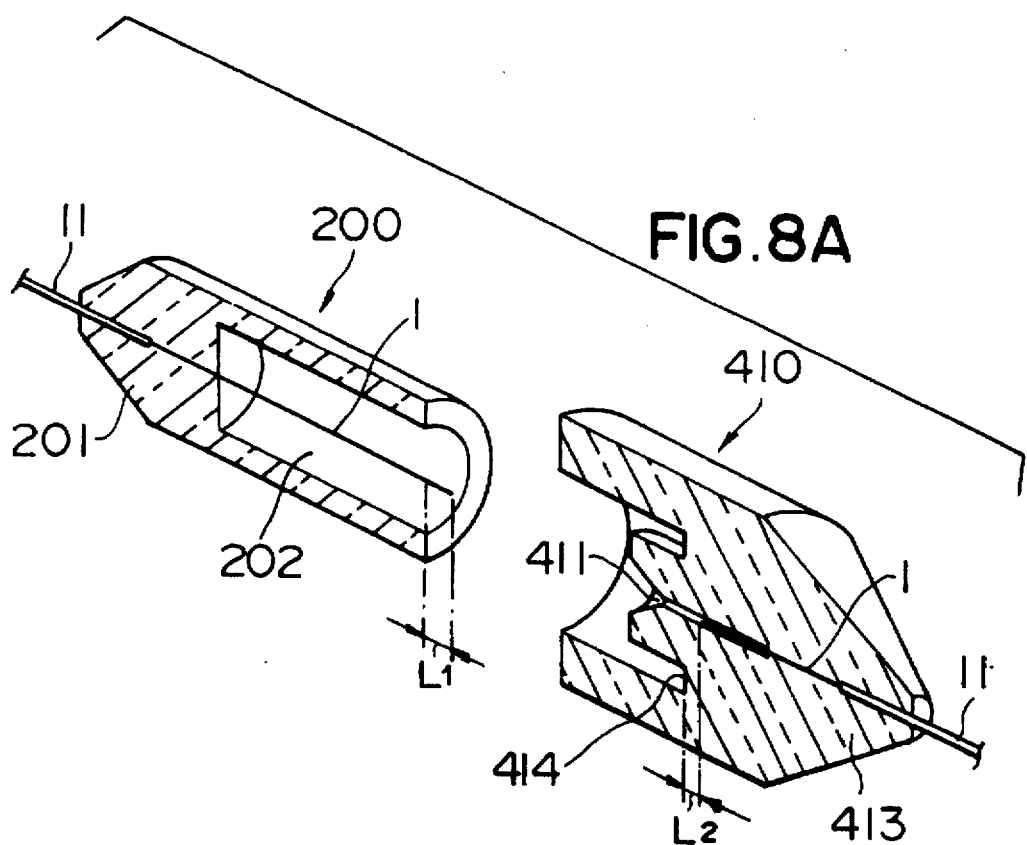
FIGS. 8A and 8B are sectional perspective views showing the structure of the third embodiment in the optical connector of the present invention.
Figure 8B:
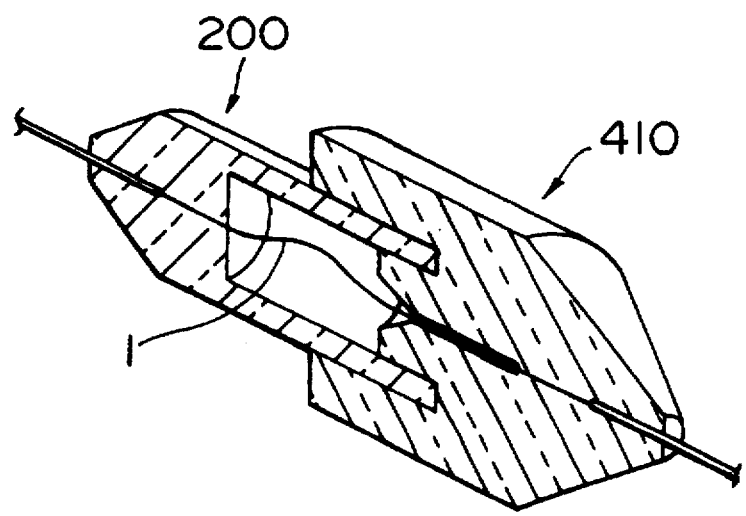

FIGS. 8A and 8B are sectional perspective views showing the structure of the third embodiment in the optical connector of the present invention. Particularly, FIG. 8A shows the structure before fitting of the plug and the jack, and FIG. 8B shows the structure after fitting thereof. In these figures, reference numeral 1 represents an optical fiber, 11 represents a coating of the optical fiber, 200 represents a plug, 201 represents an optical fiber-holding portion, 202 represents an optical fiber-bending space, 410 represents a jack, 411 represents an alignment hole for the optical fiber, 413 represents an optical fiber-holding portion, and 414 represents a plug-confronting face. The optical fiber 1 related to plug 200 protrudes from plug 200a by $L_1$ as in the first embodiment.

Jack 410 has no optical fiber-bending space, and the tip of the optical fiber 1 is arranged in the position drawn back by $L_2$ from the plug-confronting face 414 in the alignment hole, and fixed by the holding portion 413. With this structure, when plug 200 and jack 410 are fitted, as in the case that one optical fiber does not buckle in the first embodiment, the connecting face is pushed by the buckling force of the optical fiber of the plug to obtain the optical connection. Jack 410 has an advantage in its small size compared to jack 400, since it does not use the optical fiber-bending space. In addition, since the buckling portion is only one, deviation of the buckling toward one optical fiber does not occur so that the buckling become stable and insertion loss and return loss become stable even if repeatedly connected.

Figure 9:
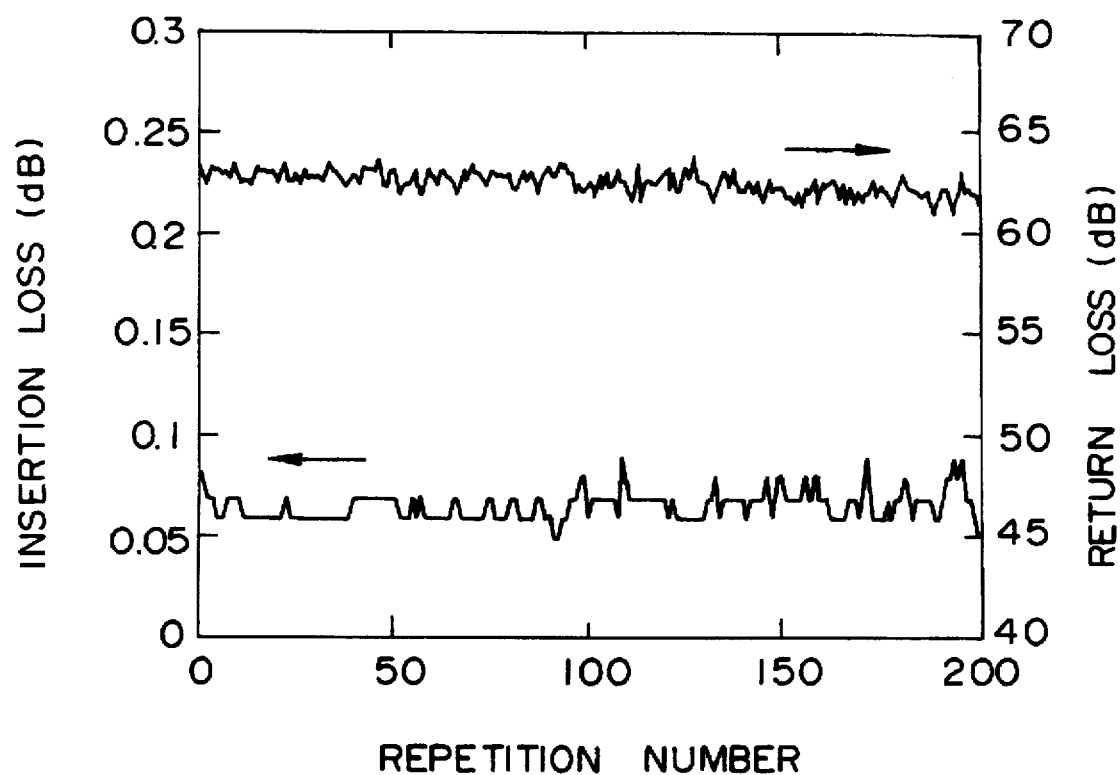
FIG. 9 is a view showing the measurement results of the insertion loss and the return loss obtained by setting the fitting angle so that the insertion loss becomes minimum and repeatedly connecting 200 times.

FIG. 9 is a view showing the measurement result of the insertion loss and the return loss, when the fitting angle is set to such an angle that the insertion loss becomes minimum and connections are conducted repeatedly 200 times. As shown in this figure, the insertion loss of not larger than 0.1 dB (fluctuation volume of not larger than 0.05 dB), and the return loss of not less than 60 dB (fluctuation volume of not larger than 2 dB) could be maintained. Though the return loss decreased to some extent and the fluctuation in the insertion loss increased to some extent before and after the test completion, the characteristics were recovered by cleaning the end face after completion of the test. Thus, even if it is connected repeatedly, the stability of the insertion loss and the return loss could be maintained without deteriorating the end face and the like of the optical fiber.

Note that the relation of $L_1$ and $L_2$ is not limited thereto, therefore it is the same as in the abovementioned embodiment.

In the above-mentioned first, second and third embodiments, when two plugs 200 are fitted from both ends of adapter 300, or, plug 200 and jack 400 or 410 are fitted, bare fibers are put opposite to each other, and the connecting end face is pushed by the buckling force of the optical fiber, thereby a ferrule and a spring means are not required to make the number of members small, and to make the connector small. Also a simple and small-sized optical fiber connector having excellent optical characteristics can be realized.

Figure 10:
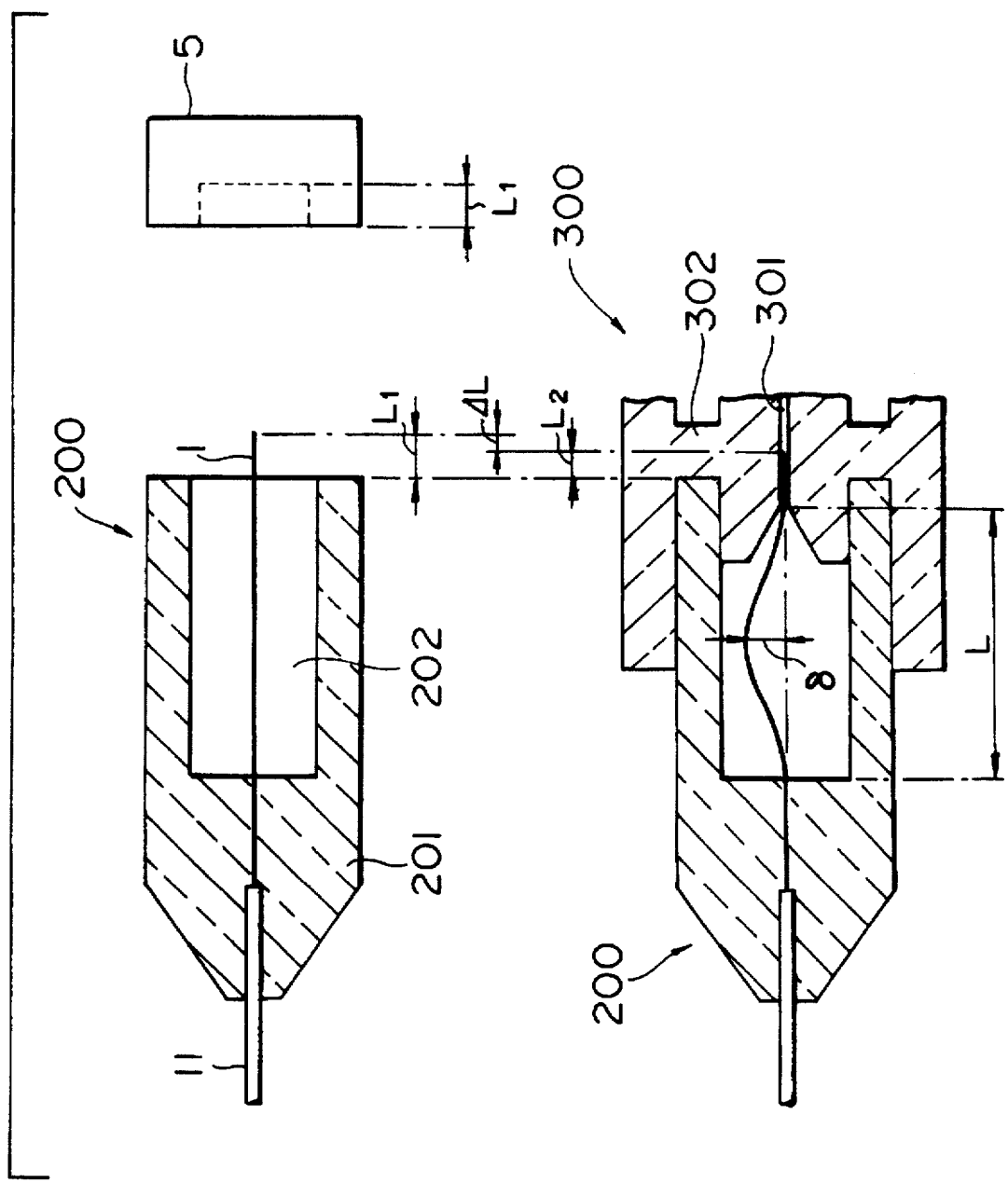
FIG. 10 is a sectional view showing the structure of the 4th embodiment in the optical connector of the present invention.

FIG. 10 is a sectional view showing the structure of the 4th embodiment in the optical connector of the present invention. In this figure, reference numeral 1 represents an optical fiber, 11 represents a coating, 200 represents a plug, 201 represents an optical fiber-holding portion, 202 represents an optical fiber-bending space, 300 represents an adapter, 301 represents an alignment hole for the optical fiber, 302 represents a supporting portion of the alignment hole, and 5 represents an optical fiber-confronting jig. The optical fiber 1 related to plug 200 protrudes from plug 200 by $L_1$ as in the first embodiment. The upper stage in the drawing shows the structure before plug 200 is fitted to adapter 300, and the lower stage shows the structure after fitting thereof. With regard to dimensions in the drawing, L represents the length of the buckling portion, $L_1$ represents the protruding length of the optical fiber from plug 200, $L_2$ represents the distance from the center of adapter 300 to the face which plug 200 in the alignment hole-supporting portion runs against, and $\Delta L$ represents the length of the optical fiber 1 pushed into plug 200 when plug 200 is fitted to adapter 300, and $\Delta L = L_1 - L_2$, and $\delta$ represents the bending volume of the optical fiber 1 at the time of fitting. The optical fiber-confronting jig 5 has a concave surface having a depth of $L_1$. The optical fiber-confronting jig 5 is arranged to the tip of plug 200, and optical fiber 1 is fixed to the optical fiber-holding portion 201 in plug 200 in a state that the optical fiber runs against the concave surface of jig 5, thus the optical fiber 1 protrudes by $L_1$ from plug 200. In this state, plug 200 is fitted to adapter 300, and if optical fibers run against each other in the center of the alignment hole, the optical fiber is pushed into the plug by $\Delta L$.

Figure 11:
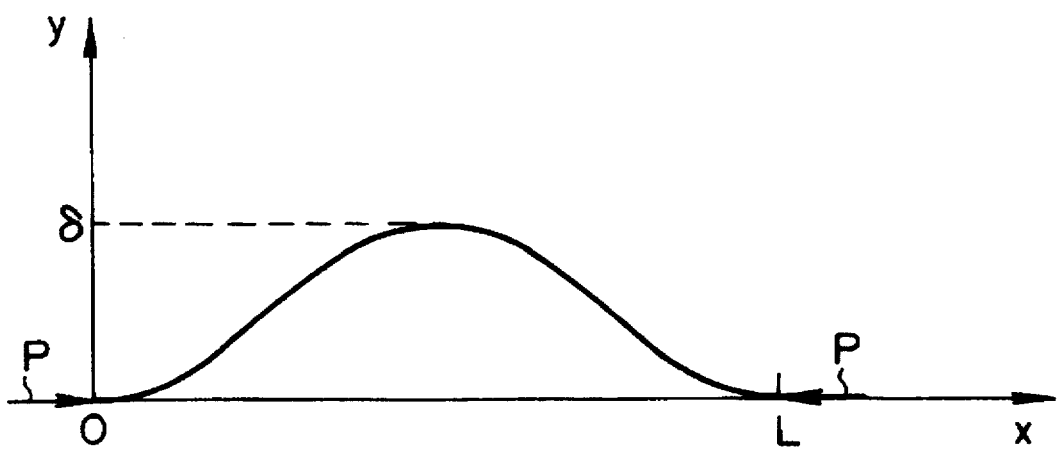
FIG. 11 is a view showing the shape of the optical fiber at the time of buckling.

The shape of optical fiber at the time of buckling is, as shown in FIG. 11 and equation (4), a shape of sine wave (for example, see "Material Mechanics", written by Okumura, Corona Co., pp. 289–301). The radius of curvature R is expressed by equation (5). In the base of optical fiber and in the middle point thereof, the radius of curvature becomes the minimum value $R_{min}$, and is expressed by equation (6), thus becomes the function of L and $\delta$.

$$y = \frac{\delta}{2} \left\{ 1 - \cos\left(2\pi \frac{x}{L}\right) \right\} \tag{4}$$

$$\frac{1}{R} = \frac{y''}{(1+y'^2)^{3/2}} \tag{5}$$

$$\frac{1}{R_{min}} = 2\pi^2 \frac{\delta}{L^2} \tag{6}$$

After fitting, the length of optical fiber at the buckling portion becomes $L+\Delta L$, thereby equation (7) is effected, and the relation between $\Delta L$ and $\delta$ is expressed by equation (8).

$$L + \Delta L = \int_0^L \sqrt{1 + (y')^2}\, dx \qquad (7)$$

$$\frac{L + \Delta L}{L} = \frac{2}{\pi} \sqrt{1 + \left(\pi \frac{\delta}{L}\right)^2} \times \text{Elliptic}\left(\frac{\left(\pi \frac{\delta}{L}\right)^2}{1 + \left(\pi \frac{\delta}{L}\right)^2}\right) \qquad (8)$$

wherein, Elliptic ( ) is the complete elliptic integral of the second kind. Therefore ΔL can be determined from equations (6) and (8) so that the radius of curvature becomes larger than the allowable value.

For example, it is possible to set such that δ=0.9 mm and $R_{min}$=5.6 mm, assuming that L=10 mm and ΔL=0.2 mm, using 1.3 μm band single-mode optical fiber, thus the loss increase due to bending loss can be suppressed to not larger than 0.02 dB. Furthermore, breaking of optical fiber is caused if R=3 mm or smaller, thereby if the setting value is larger than this, breaking is not caused.

As described in the first and the third embodiments, there is a case where only one optical fiber buckles. In this case, the maximum shrinkage becomes 2ΔL. Therefore, in the case of the above-mentioned 1.3 μm band single-mode optical fiber, the loss increase can be suppressed and breaking can be prevented by making ΔL =0.1 mm.

According to the present embodiment, by controlling ΔL, bending δ of the buckling portion can be controlled to prevent the increase of bending loss and breaking due to the increase of bending.

FIG. 12 is a partially sectional perspective view showing the structure of the fifth embodiment in the optical connector of the present invention. In this figure, reference numeral 1 represents an optical fiber, 11 represents a coating, 210 represents a plug, 213 represents a notch, 300 represents an adapter, 301 represents an alignment hole for the optical fiber, 302 represents an alignment hole-supporting portion for the optical fiber, and 303 represents a feedthrough portion for the tip of plug. Adapter 300 has a feedthrough portion 303 so that the tip of plug 210 is put against it. The notch portion 213 at the tip of plug 210 is to avoid the alignment hole-supporting portion 302 for the optical fiber. Optical fiber 1 protrudes by ΔL from the tip of plug 210.

Referring to FIG. 12, only one plug 210 is shown, and the other plug is omitted, but as in the case of the first embodiment shown in FIGS. 2A and 2B, two plugs 210 are inserted and fitted from both sides, and two optical fibers 1 are connected in the alignment hole 301 of adapter 300.

According to the present embodiment, the protruding length of the optical fiber can be made small, thereby the protectability of the optical fiber is improved. In addition, since the dimension $L_2$ used in the first to the fourth embodiments is not necessary, one dimension for considering error is reduced, thus the precision of the protruding length can be improved.

Figure 13A:
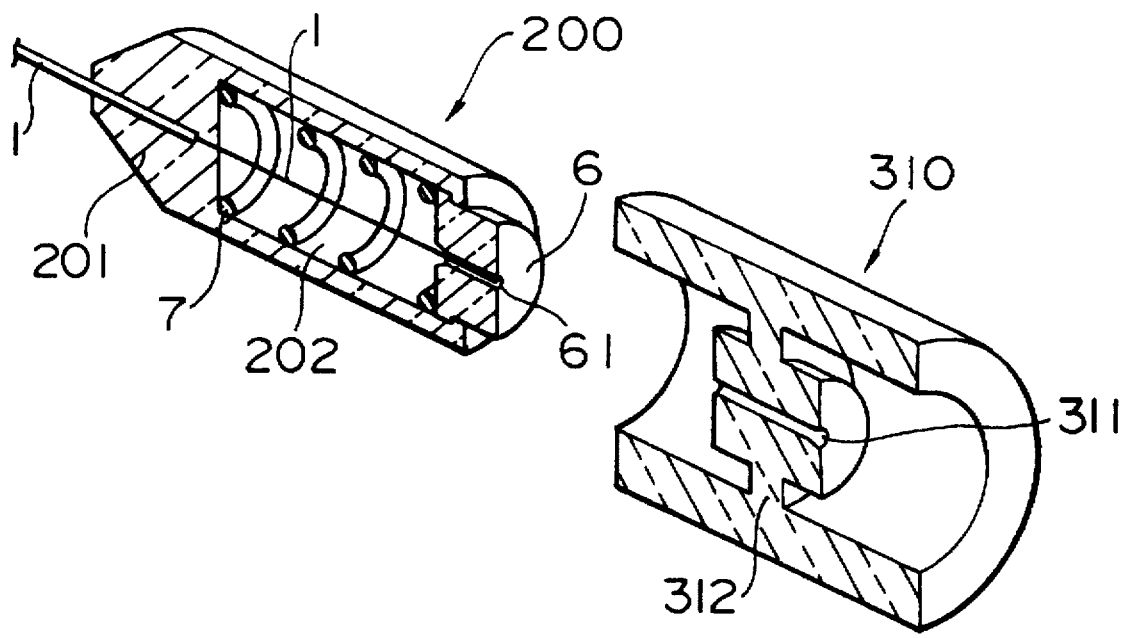
FIGS. 13A and 13B are sectional perspective views showing the structure of the 6th embodiment in the optical connector of the present invention.
Figure 13B:
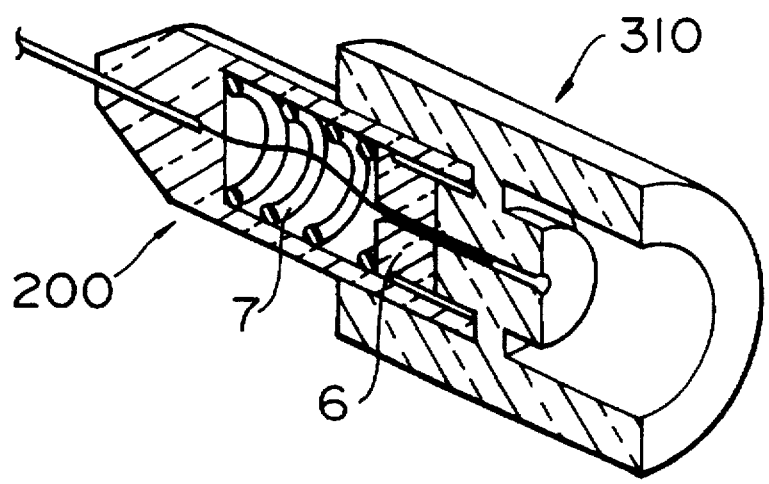

FIGS. 13A and 13B are sectional perspective views showing the structure of the 6th embodiment in the optical connector of the present invention. In these figures, reference numeral 1 represents an optical fiber, 11 represents a coating, 200 represents a plug, 201 represents an optical fiber-holding portion, 202 represents an optical fiber-bending space, 310 represents an adapter, 311 represents an alignment hole for the optical fiber, 312 represents an alignment hole-supporting portion, 6 represents an optical fiber sub-alignment member, 61 represents an alignment hole for the optical fiber in the sub-alignment member 6, and 7 represents a spring. FIG. 13A shows the structure before plug 200 is fitted to adapter 310, and FIG. 13B shows the structure after fitting. In these figures, the other plug is not shown. Actually, it is not until plugs are fitted from both ends that the optical fiber buckles. The sub-alignment member 6 has an alignment hole 61 for the optical fiber, arranged at the tip of plug 200, and slides in the optical fiber-bending space 202 while being pushed from the rear by spring 7. When plug 200 is fitted to adapter 310, sub-alignment member 6 is housed in the optical fiber-bending space 202, and only the tip of optical fiber 1 is inserted to the alignment hole 311. When plug 200 is detached from adapter 310, the sub-alignment member 6 returns to the original position by means of spring 7.

According to this embodiment, first, the alignability of the optical fiber is improved, and the aperture of the taper provided at the entrance of the alignment hole 311 may be small. Setting of the protruding length of optical fiber is made easy by making the protruding length from plug 200 of the sub-alignment member 6 equal to the protruding length $L_1$ of the optical fiber. Furthermore, the protectability of the optical fiber is improved. Note that the present embodiment may be used together with the structure of the 5th embodiment in which the tips of plugs are put against each other.

With regard to the aperture of taper, the aperture diameter can be made to be 0.25 mm, by designating the precision of fit of the plug and the adapter as ±50 μm, the precision of central position of the alignment hole of the alignment member and the sub-alignment member as ±10 μm, the precision of inner diameter of alignment hole as ±1 μm, and the precision of aperture diameter as ±10 μm. Thus, optical fibers can be implemented with an interval as small as 0.25 mm as used in the ribbon fiber, when the number of fibers are multiplied as in the embodiment shown below.

Figure 14A:
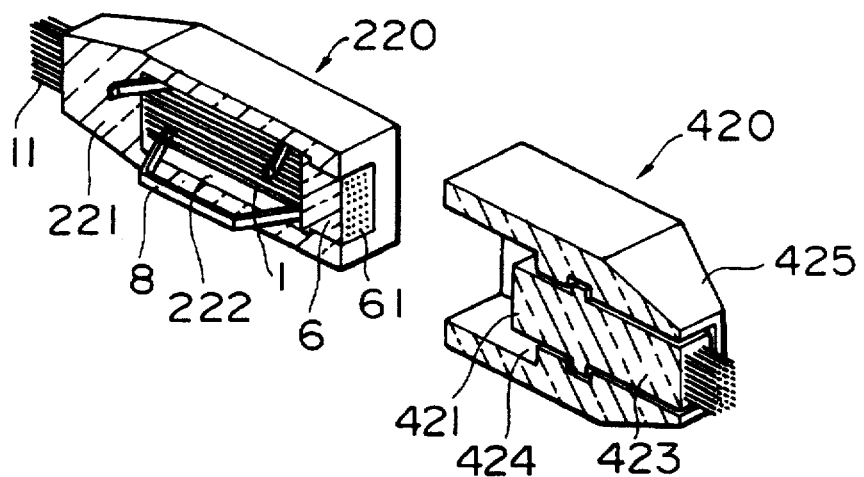
FIGS. 14A, 14B and 14C are partially sectional perspective views showing the structure of the 7th embodiment in the optical connector of the present invention.
Figure 14B:
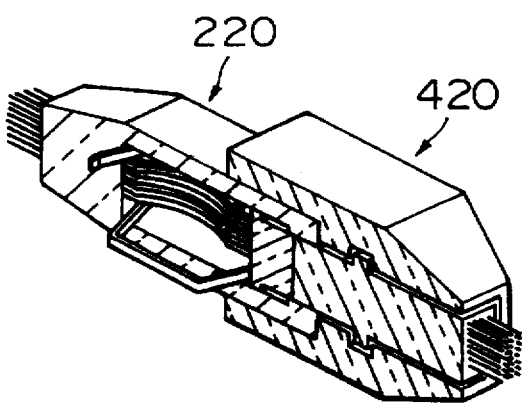

FIGS. 14A and 14B are partially sectional perspective views showing the structure of the 7th embodiment in the optical connector of the present invention. In these figures, reference numeral 1 represents an optical fiber, 11 represents a coating, 220 represents a plug, 221 represents an optical fiber-holding portion, 222 represents an optical fiber-bending space, 420 represents a jack, 421 represents a group of alignment holes for the optical fiber, 423 represents an optical fiber-holding portion, 424 represents a plug-confronting face, 425 represents a jack frame, 6 represents an optical fiber sub-alignment member, 61 represents an alignment hole for the optical fiber in the sub-alignment member 6, and 8 represents a flat spring.

Figure 14C:
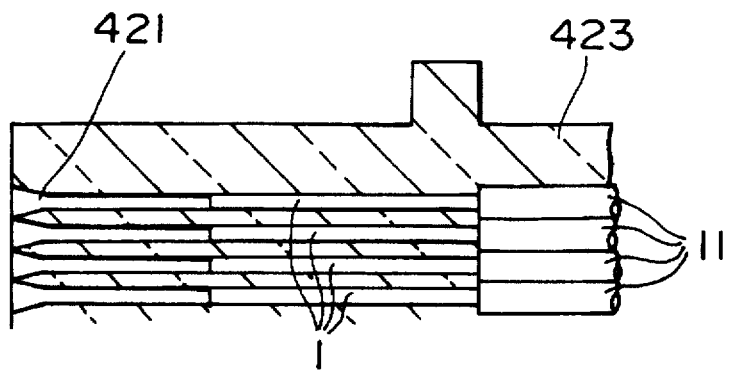

The optical fiber connector as shown in FIG. 14B is formed by fitting plug 220 to jack 420 shown in FIG. 14A. FIG. 14C is an enlarged sectional view of alignment hole group 421 of jack 420 and optical fiber 1 inserted into the alignment hole group 421.

The optical fiber connector shown in FIGS. 14A to 14C is implemented with 64 holes in total, such that optical fiber 1 group is arranged in 8 holes respectively lengthwise and widthwise in plug 220. For the tip of plug 220, the structure of the 6th embodiment is applied and the sub-alignment member 6 is arranged. The sub-alignment member 6 protrudes by ΔL from the tip of plug 220 so that the pushed length of optical fiber on the plug side becomes ΔL, and tips of optical fiber group are arranged even with the tip face of the sub-alignment member 6. The offset in arrangement of tips can be set to ±5 μm. In order to secure the bending space of the optical fiber group, a flat spring 8 is used to push the sub-alignment member 6 from the rear. To jack 420 is arranged an alignment hole group 41 in the similar arrangement with the plug, and optical fibers in the optical fiber group are fixed, respectively, at the holding portion 423 so that tips thereof come to the position of the plug-confronting face 424. Alignment hole group 421 and optical fiber-holding portion 423 are made to float in the jack frame 425 to make it easy to fit. Furthermore, by using sub-alignment member 6 and designating the aperture of the entrance of alignment hole 421 as 0.25 mm, the pitch between optical fibers is made to be 0.25 mm. Accordingly, even if there are eight holes, the width is only 2 mm, and plug 220 can be made as small as 5 mm lengthwise and widthwise. When plug 220 and jack 420 are fitted, the optical fiber group is put against the corresponding alignment holes, and the contact face is pushed by the respective buckling force.

According to the present embodiment, an optical fiber connector which can be implemented with higher precision can be realized. Furthermore, even if the position of tips differs among plural optical fibers, the offset is absorbed at the buckling portion for every connection, thereby PC connection is realized certainly.

Figure 15A:
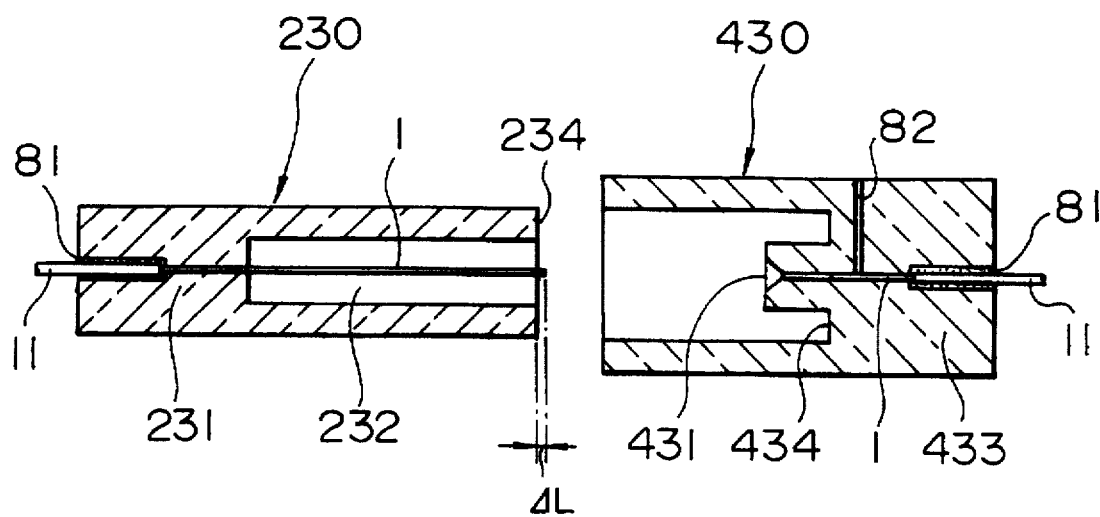
FIGS. 15A and 15B are sectional views showing the structure of the 8th embodiment in the optical connector of the present invention.
Figure 15B:
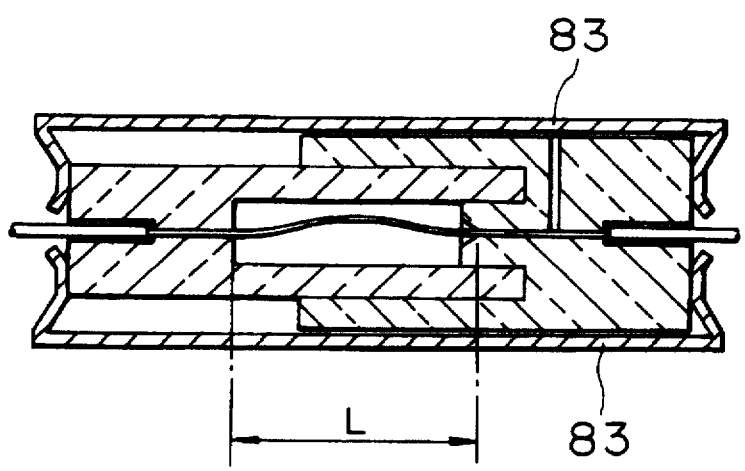

FIGS. 15A and 15B are sectional views showing the structure of the 8th embodiment in the optical connector of the present invention. In these figures, reference numeral 1 represents an optical fiber, 11 represents a coating, 230 represents a plug, 231 represents an optical fiber-holding portion, 232 represents an optical fiber-buckling space, 234 represent a tip face of the plug, 430 represents a jack, 431 represents an alignment hole for the optical fiber, 433 represents an optical fiber-holding portion, 434 represents a plug-confronting face, 81 represents an adhesive, 82 represents an adhesive-injecting hole, and 83 represents a fixing clip. The linear expansion ratio of the plug material is made not larger than $1 \times 10^{-5}$/K. FIG. 15A shows the structure before fitting, and FIG. 15B shows the one after fitting.

Two optical fibers 1 are fixed to plug 230 and jack 430, respectively, by the adhesive 81. At this time, the optical fiber 1 related to plug 230 protrudes by $\Delta L$ from the tip face 234 of the plug as the protruding length, and the optical fiber 1 related to jack 43 is fixed so that the tip thereof coincides with the plug-confronting face 434. Plug 230 is fitted to jack 430, and when both of them are fixed with the fixing clip 83 in the state that the tip face of the plug 234 runs against the confronting face 434, the optical fiber 1 related to plug 230 is inserted to the alignment hole 431, and two optical fibers 1 run against each other, thus the protruding length $\Delta L$ at the buckling portion is absorbed to the buckling portion of the length L, and the optical fiber 1 related to plug 230 buckles and bends by $\delta$. The optical fiber contact face is pushed by this buckling force, and the end faces come into intimate contact with each other by shaping the end face of the optical fiber into an even face, and optical fiber connection with little reflection can be realized.

Figure 16:
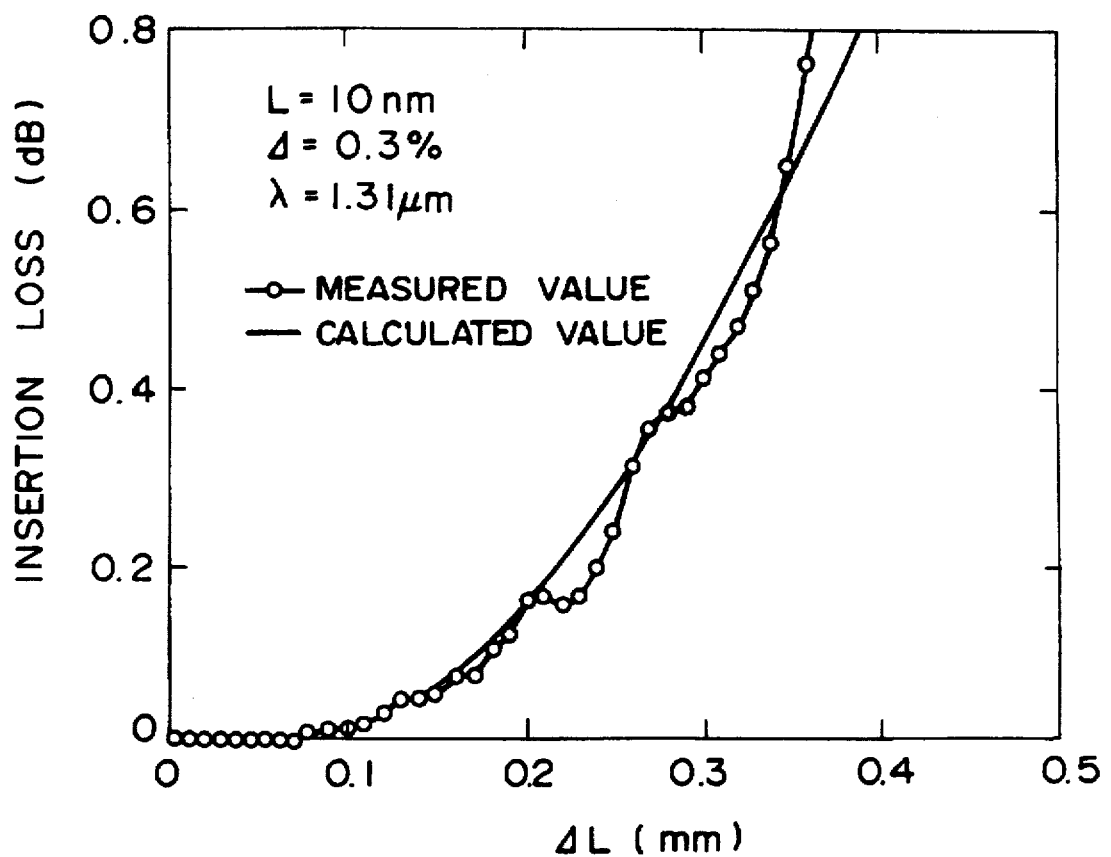
FIG. 16 is a view showing the relationship of the insertion loss with respect to the shrinkage of the optical fiber.

Here, it is necessary to control the bending volume $\delta$ so that the radiation loss due to bending at the buckling portion 232 does not become excessive. $\delta$ can be controlled by $\Delta L$ as shown in equation (8). Moreover, as shown in equation (1), the buckling force P which becomes the force to bring the connecting face into intimate contact can be controlled by the buckling length L. From the necessary buckling force, L becomes 10 mm or so. When 1.3 μm band single-mode optical fiber is used and the buckling length is assumed to be L=10 mm, the bending volume does not become excessive by making $\Delta L$=0.2 mm, and the radiation loss due to bending of the optical fiber at the buckling portion can be suppressed to not larger than 0.02 dB. In FIG. 16, the experimental result is shown in the line with circles "○".

In the present embodiment, the linear expansion ratio of the plug material is assumed to be not larger than $1 \times 10^{-5}$/K, and as a result, the change in the buckling length can be suppressed to 0.01 mm in the temperature range of from $-20°$ to $70°$ C. which is the general region for use with respect to the buckling length of 10 mm. The upper limit of $\Delta L$ in which the radiation loss due to buckling does not become excessive is about 0.2 mm. Therefore, if it is set to the intermediate value thereof, $\Delta L$=0.1 mm, even if $\Delta L$ changes relatively due to the temperature change, $\Delta L$ does not become below 0 or larger than 0.2 mm, and in the used temperature range, it becomes possible to maintain the intimate contact state of the connecting portion, to suppress the generation of radiation loss due to the excessive bending volume, and to maintain favorable optical fiber connection.

For example, the linear expansion ratio of silica is the same with that of the optical fiber and as small as $0.5 \times 10^{-6}$/K, and does not change $\Delta L$ at all with respect to the temperature change.

The linear expansion ratio of glass-type material is not larger than $1 \times 10^{-5}$/K, such that borosilicate glass has $5 \times 10^{-6}$/K, Pyrex has $3 \times 10^{-6}$/K, and Neoceram or crystallized glass called as Pyroceram has $(0.7 \sim 2) \times 10^{-6}$/K. These glass materials are cheap compared to silica and machining thereof is easy.

Invar (nickel-type alloy) and Fernico (iron-nickel-cobalt-type alloy, also referred to as "cobar") are metals having low linear expansion ratio, and the linear expansion ratio thereof is as low as $(1 \sim 2) \times 10^{-6}$/K, and $(4 \sim 5) \times 10^{-6}$/K, respectively. Since they are metals, cutting is easy, and they are also suitable for the connector member for machining.

There are liquid crystal polymers of polyester type having the linear expansion ratio of not larger than $1 \times 10^{-5}$/K, which can be injection-molded, and are suitable as a connector member for mass production.

Figure 17:
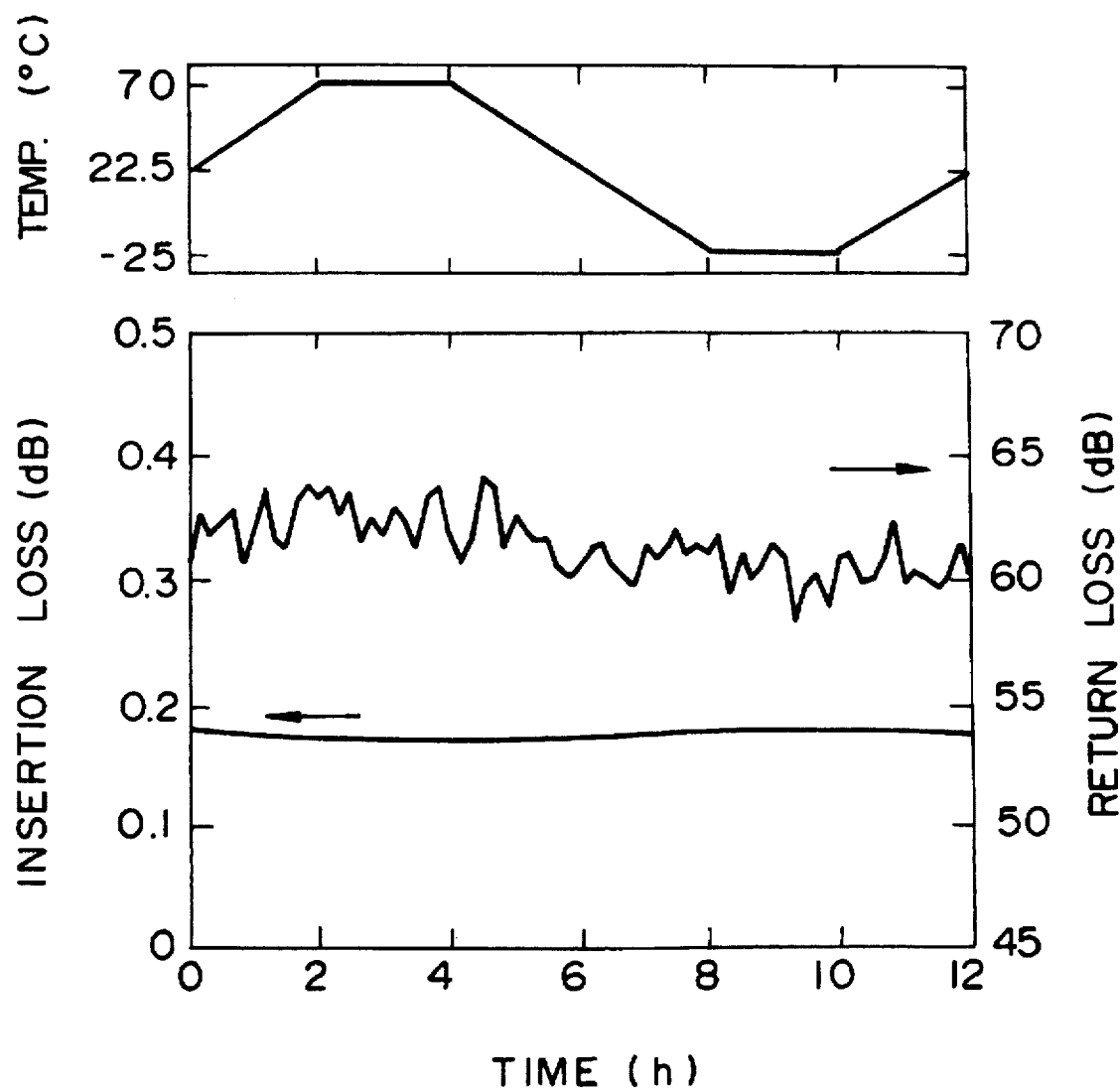
FIG. 17 is a view showing the change in the insertion loss and the return loss with respect to the temperature change.

FIG. 17 is a view showing the change in the insertion loss and the return loss with respect to the temperature change. As shown in this figure, the insertion loss and the return loss hardly change with respect to the temperature change from $-25°$ to $70°$ C. It is considered that is because the change in the length of the plug due to the temperature change is absorbed at the buckling portion of the fiber. Namely, it means that the pushing force between fibers is stable.

If $\Delta L$ is calculated by the following procedure, it is more accurate than being determined from the minimum bending radius ($R_{min}$) of the buckling portion, and can be applied also to optical fibers having different characteristics and to different wavelength to be used.

As described above, the relations between the shape of the optical fiber at the time of buckling, the radius of curvature R, the protruding length of buckling $\Delta L$ and bending $\delta$ are expressed by equations (4), (5) and (8). The radiation loss coefficient $\alpha$ per unit length at the time of radius of curvature R is given by the following equation (9) according to A. W. Snyder, L White, and D. J. Mitchell, "Radiation from bent optical waveguides", Electron., Lett., 11, pp.332–333, 1975.

$$\alpha = \frac{1}{\sqrt{\pi a w R}} \left( \frac{u}{v} \right)^2 \exp\left( -\frac{4w^3}{3v^2} \Delta \frac{R}{a} \right) \tag{9}$$

wherein a represents the core radius of the optical fiber, v, u and w represent normalized frequency, and propagation constants of the core and the cladding layer, respectively. The normalized frequency v is expressed by the following equations (10) and (11):

$$v^2 = k^2 n_c^2 a^2 2\Delta \tag{10}$$

$$k = \frac{2\pi}{\lambda} \quad (11)$$

Propagation constants u and w can be determined from the following simultaneous equations (12) and (13) (for example, see Ohkoshi, Okamoto and Yasutate, "Optical Fiber", Ohmu Co., pp.61–70):

$$u^2 + w^2 = v^2 \quad (12)$$

$$\frac{uJ_1(u)}{J_0(u)} = \frac{wK_1(w)}{K_0(w)} \quad (13)$$

wherein $n_c$ represents the core refractive index, $J_n$ and $K_n$ represent deformed Bessel functions of the n-th first and second type, respectively.

If the above equations are substituted for the following equation (14), the whole radiation loss of the buckling portion is obtained by integrating the radiation loss calculated from the curvature of respective points along the buckling shape.

$$\Gamma(dB) = 4.34 \int_0^{L-\Delta L} \alpha \sqrt{1 + (y')^2} \, dx \quad (14)$$

The calculated value determined by the procedure described above is shown in FIG. 16 by solid line. It coincides well with the actually measured value, thereby it proves the correctness of this procedure.

Accordingly, the generated loss can be calculated from the parameter of the optical fiber, the wavelength of the light to be used, the buckling length, and the buckled protruding length. And the upper limit of the buckled protruding length ΔL can be calculated by performing repeatedly the calculation so that this calculated value does not exceed the predetermined value.

FIGS. 18A and 18B are perspective views showing the structure of the 9th embodiment in the optical connector of the present invention. In the 9th embodiment, the adapter is divided into an alignment member and a fixing member with respect to the 5th embodiment shown in FIG. 12, and it comprises two plugs 240, a sleeve 91 and a split pipe 92.

Plug 240 holds optical fiber 1 having a shaped end face at one end via an adhesive 81. The other end thereof is opened, and has a bending space 242 for the optical fiber, and holds optical fiber 1 so as to protrude by ΔL. The aperture has a step and the sleeve 91 is housed half by half in respective plugs 240. When the sleeve 91 is inserted to one plug 240, optical fiber 1 of plug 240 is inserted into the sleeve 91. Then, when two plugs 240 are inserted to the split pipe 92 from both sides and pushed in, two plugs 240 are brought into contact. At this time, the protruding length ΔL of respective optical fibers are pushed into the cavity to buckle the optical fiber, and the connecting face is pressed by the buckling force to realize the PC connection. In addition, the inner diameter of split pipe 92 is somewhat smaller than the outer diameter of the plug, and at the time of fitting, the split pipe 92 holds the plug in an enlarged state, and maintains the fitting by friction.

According to this embodiment, in addition to the advantage of the 5th embodiment, there is no need to provide a notch in the plug. The machining to add the stepped space in the cylindrical member is performed only by a lathe, but machining to add a notch in the lateral direction requires machining using a milling cutter, therefore this embodiment can reduce the machining volume. Furthermore, slip pipe 92 can be produced with a thin member, thereby the whole size can be made small.

FIGS. 19A and 19B are perspective views showing the structure of the 10th embodiment in the optical connector of the present invention. The jack 410 in FIG. 8A is divided into the second plug 250, sleeve 91 and split pipe 92. The first plug 200 holds optical fiber 1 having a shaped end face at one end via an adhesive 81. The other end thereof is opened, and has a bending space 202 for the optical fiber, and holds optical fiber 1 so as to protrude by ΔL. The second plug 250 also holds optical fiber 1 having a shaped end face at one end via an adhesive 81. The other end thereof for housing about half of the sleeve 91 is opened. The end face of the second plug 250 and the end face of optical fiber 1 coincide. Firstly, sleeve 91 is inserted to the second plug 250. Secondly, the first and the second plugs 200, 250 are pushed into the split pipe 92. Thereby, the first plug 200 and the second plug 250 are brought into surface contact. At this time, the protruding length of optical fiber 1 related to the first plug 200 is pushed into the cavity to buckle the optical fiber 1, and the connecting end face is pressed by the buckling force to realize the PC connection. The inner diameter of split pipe 92 is somewhat smaller than the outer diameter of the plug, and at the time of fitting, the split pipe 92 holds the plug in an enlarged state, and maintains the fitting by friction.

According to this embodiment, since the buckling portion is only one, there is no deviation of buckling toward one optical fiber such as the one generated in the case of two buckling portions, and the bending loss and the insertion loss are made stable. Even if they are repeatedly connected, the insertion loss and the return loss are further stabilized than the results shown in FIG. 9. Moreover, the stability is improved with respect to the mechanical strength. Also, down-sizing of the connector becomes possible.

FIG. 20 is a perspective view showing the structure of the 11th embodiment in the optical connector of the present invention. This embodiment relates to an optical fiber connector capable of connecting four optical fibers. Plug 260 holds optical fibers 1 at one end via an adhesive, and the other end becomes a cavity and optical fibers 1 protrude by ΔL. The cavity portion of plug 270 is small, the end face of optical fiber 1 agrees with the end face of plug 270. Porous member 93 has holes to which optical fibers 1 are inserted. At the entrance of alignment holes for optical fibers of porous member 93, only the side where plug 260 is inserted is tapered. The porous member 93 is attached to the fixing member 94, and these are integrated to function as an adapter 320. The dimensions a and a', b and b' in plugs 260 and 270 and porous member 93 are made close to each other, as a fit dimension. The fixing member 94 has pawls 941, and two plugs 260, 270 have a step 265, 276, respectively, at the rear end, thus the pawls 941 of the fixing member 94 press down two plugs 260 and 270 from outside of these steps 265 and 276. Namely, pawls 941 and the central portion of the fixing member are connected by plates having different length, and pawls are open in the state that the longer plate bends toward inside, and pawls 941 are closed in the state that it bends toward outside. Pawls 941 are open before fitting the plug, and when plugs 260 and 270 are inserted thereto, since the side faces of plugs 260 and 270 have projections 267, 278, they push the longer plate bent toward inside of the fixing member 94, and as a reaction, the plate bends outwardly to close the pawls 941, thereby plugs 260 and 270 are fixed to the adapter 320. When two plugs 260 and 270 are fitted thereto, plug 260 and plug 270 are brought into surface contact with each other, and optical fibers 1 protruding from the tip of plug 260 are pushed to the cavity and buckle to realize the PC connection at the connecting point. Plugs 260 and 270, and porous member 93 are fitted in the portions a–a', and b–b' at the time of fitting, and lastly optical fibers 1 and the alignment holes face each other.

Even if a taper does not exist at the entrance of alignment holes on the plug 270 side of the porous member 93, by applying chamfering to the end face of optical fiber 1, the insertion can be smoothly realized, since the length of optical fiber 1 on the plug 270 side in the state of a cantilever is small, thus the volume of miss alignment of axis of the tip of optical fiber 1 is small. When these members are produced by injection molding, this structure is effective. This is because in the case of injection molding, it becomes impossible to set a taper on both sides of holes, as the molding cannot be pulled out.

Furthermore, this embodiment sets the fit in the longitudinal direction between the cavity side of the plug and to the outside of the porous member, thereby it becomes possible to make the connector thin.

Furthermore, the fixing member 94 functions by the insertion of plugs 260 and 270, therefore it is not necessary to enlarge a clip spring to put two plugs therebetween by using a tool, as in the conventional confronting-type MT connector. When plugs 2g and 2h are detached, it is realized by pushing the bending portion from outside by hand.

Incidentally, at the time of fitting, though a cavity remains between plug 270 and porous member 93, this cavity has an effect to absorb the deviation in position between the optical fiber-holding portion of plugs 260, 270 and alignment holes of porous member 93. If there is no such cavity, and if there is a deviation in position of 1 µm between the optical fiber-holding portion and alignment holes of porous member 93, a large shear force is effected to optical fibers 1 to break them. Note that, since the cavity of the plug 260 side is longer than that of the plug 270 side, optical fibers 1 do not buckle in the cavity of optical fiber 270 side.

Figure 21A:
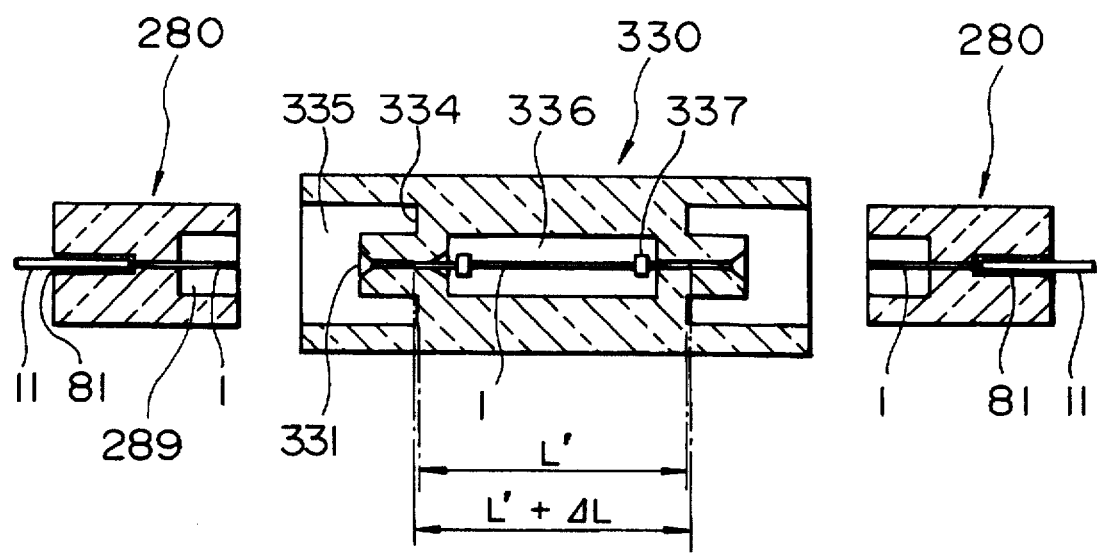
FIGS. 21A and 21B are sectional views showing the structure of the 12th embodiment in the optical connector of the present invention.
Figure 21B:
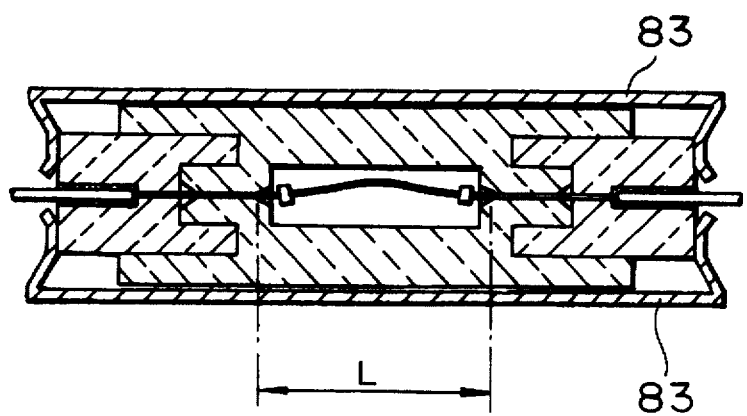

FIGS. 21A and 21B are sectional views showing the structure of the 12th embodiment in the optical connector of the present invention. Reference numeral 1 represents an optical fiber, 280 represents a plug, 289 represents an adapter alignment portion-inserting portion, 330 represents an adapter, 331 represents an alignment hole for the optical fiber, 334 represents a plug-confronting face, 335 represents a plug-inserting portion, 336 represents a cavity for bending, 83 represents a fixing clip, 81 represents an adhesive, and 337 represents an optical fiber-stop piece. FIG. 21A shows the structure before plug 280 is fitted to adapter 330, and FIG. 21B shows the structure after fitting thereof.

Plug 280 has an adapter alignment portion-inserting portion 289 and holds optical fiber 1 by an adhesive 81 so that the tip of optical fiber 1 coincides with the tip of the plug.

Adapter 330 has alignment holes 331 for the optical fiber on both ends, and a cavity 336 for the optical fiber 1 to bend therebetween. The optical fiber 1 is longer by ΔL than the distance L' between a pair of plug-confronting faces 334. The stop piece 337 prevents the optical fiber 1 from dropping out from the adapter 330. The stop piece 337 is a small and elastic member so as not to hinder the optical fiber 1 from buckling. The length of the space for the optical fiber 1 to bend is L including the tapered portion.

When two plugs 280 are fitted to adapter 330, and fixed by fixing clip 83, optical fiber 1 in the adapter is shrinked by ΔL, and buckles in the cavity 336. By the buckling force generated at this time, respective optical fibers 1 are brought into intimate contact, and optical fibers 1 related to a pair of plugs 280 are optically connected.

Since it has the optical fiber buckling only in the adapter, mechanical load is not applied to the optical fiber fixed in the plug.

Figure 22A:
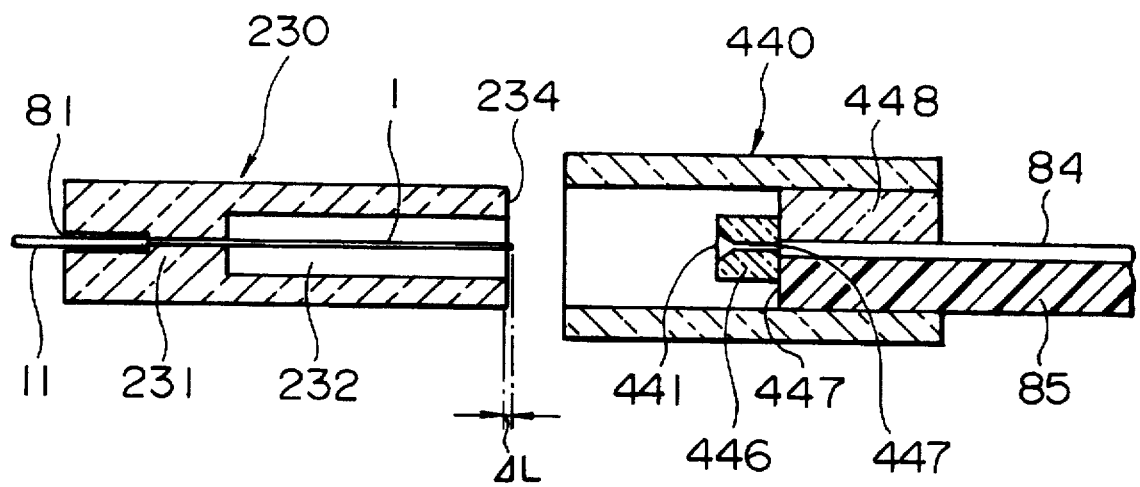
FIGS. 22A and 22B are sectional views showing the structure of the 13th embodiment in the optical connector of the present invention.
Figure 22B:
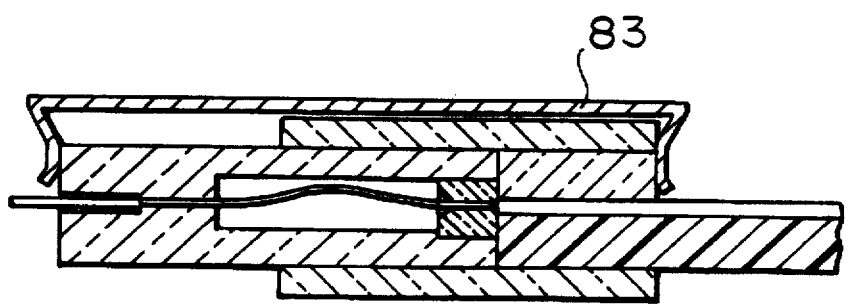

FIGS. 22A and 22B are sectional views showing the structure of the 13th embodiment in the optical connector of the present invention. Reference numeral 1 represents an optical fiber, 11 represents a coating of the optical fiber, 230 represents a plug, 231 represents an optical fiber-holding portion, 232 represents an optical fiber-buckling portion, 234 represents a tip face of the plug, 81 represents an adhesive, and 83 represents a fixing clip. Furthermore, 440 represents a jack, 448 represents a glass block, 84 represents an optical waveguide made of silica material, 85 represents an optical waveguide substrate, 447 represents an end face of the optical waveguide including end face portions of the optical waveguide substrate 85 and the glass block 448, 446 represents an optical fiber guide, and 441 represents an alignment hole. FIGS. 22A and 22B show the states before and after plug 230 is fitted to jack 440, respectively. In this case, the linear expansion ratio of the material of plug 230 is made not larger than $1 \times 10^{-5}/K$.

In order to adjust plug 230 to a proper position in the vertical direction with respect to the optical waveguide 84, and to facilitate attachment of the optical fiber guide 446 to the end face 447 of the optical waveguide, glass block 448 is attached to optical waveguide 84. The end face 447 of the optical waveguide is polished so that it becomes vertical and flat with respect to the optical axis, after glass block 448 is attached on the optical waveguide 84. Optical waveguide 84 and optical waveguide substrate 85 are fixed by jack 440. Optical fiber 1 is fixed to plug 230 by the adhesive 81. At this time, optical fiber 1 protrudes by ΔL from the tip face of the plug 230 as the absorbed length to the buckling portion 232. This ΔL is adjusted to the suitable length as described in the 7th embodiment.

Now, when plug 230 is fitted to jack 440, and both of them are fixed by a clip 83 in the state that the tip face 234 of the plug runs against the end face 447 of the optical waveguide, optical fiber 1 is inserted to the alignment hole 441 of the fiber guide 446, and the tip of optical fiber 1 runs against the end face 447 of the optical waveguide, the protruding length ΔL is absorbed in the buckling portion, and optical fiber 1 buckles and bends. By the buckling force at this time, the connecting face of the tip of optical fiber 1 is pressed against the end face 447 of the optical waveguide, and PC connection is realized between these faces. Thereby, the return loss becomes very large, since the refractive index of the core and cladding of the optical fiber 1 and the optical waveguide 84 are substantially equal. Furthermore, at this time, the optical axis of optical fiber 1 coincides with that of optical waveguide 84 by optical fiber guide 446, and these cores are confronted with each other accurately, thereby the connecting loss becomes minimum. Namely, the connecting loss becomes small up to the principle loss because of mismatch of the field distribution of the waveguide mode of optical fiber 1 and optical waveguide 84. According to the principle described above, the connection of this embodiment does not require to use the refractive index matching liquid.

In this embodiment, the tip of optical fiber 1 can be formed by being polished so as to be flat with respect to the optical axis, or polished in a spherical shape so that the core portion becomes convex, or only by being cleaved. When it is cleaved, ripples formed in the vicinity of the outer periphery of cladding at the tip portion are removed in advance. When the tip of optical fiber 1 is confronted with the end face 447 of the optical waveguide, both end faces cause an elastic deformation, therefore both end faces are not required to be made completely flat in order to realize the above-mentioned PC connection. Furthermore, with regard to the end face 447 of the optical waveguide, since a deteriorated layer due to machining having different refractive index is formed on the surface if optical fiber 1 is only polished, higher return loss can be obtained by removing the layer. As a method to remove it, there can be mentioned a wet etching using an acid solution and the like, a dry etching such as ion etching and the like, or polishing using ceric oxide and $SiO_2$ particles. Furthermore, as the other forming method of the end face 447 of the optical waveguide, cleaved surface may be used. In the case where Si single crystal substrate is used as the optical waveguide substrate 85, when the optical waveguide 84 as well as the optical waveguide substrate 85 are cleaved, the substrate is cleaved flatly along the crystal face, therefore the cleaved surface of the optical waveguide 84 is made substantially flat. In the cleaved surface, there exists no deteriorated layer due to machining, thereby there is an advantage in that it can save trouble to remove the deteriorated layer due to machining as in the case where the optical fiber is polished.

It may be considered to polish the end face 447 of the optical waveguide not vertically but obliquely with respect to the optical axis in order to obtain larger return loss. In this case, it is necessary to make the tip face of optical fiber oblique corresponding thereto. However, when the optical fiber 1 is confronted with the optical waveguide 84, realization of PC connection becomes difficult, and divergence of the optical axis may be caused easily.

In the case where the optical waveguide comprising a semiconductor, multi-component glass and optical crystal materials such as $LiNbO_3$, and silica-type fiber are optically connected, since the refractive index of the core and cladding of the optical waveguide differs largely from those of silica-type optical fibers, even if PC connection is realized, the return loss cannot be made large sufficiently. In this case, after removing the deteriorated layer due to machining by polishing the end face of the optical waveguide, by applying nonreflective coating to that face, sufficiently large return loss can be obtained. The same thing can be said in the case of connecting the plastic optical fiber and the optical waveguide.

This embodiment can apply not only to the case where one optical waveguide and one optical fiber are optically connected, but also to the case where plural optical waveguides and optical fibers are optically connected together, that is, multiple fibers are connected, as shown in the next 14th embodiment in detail.

Figure 23A:
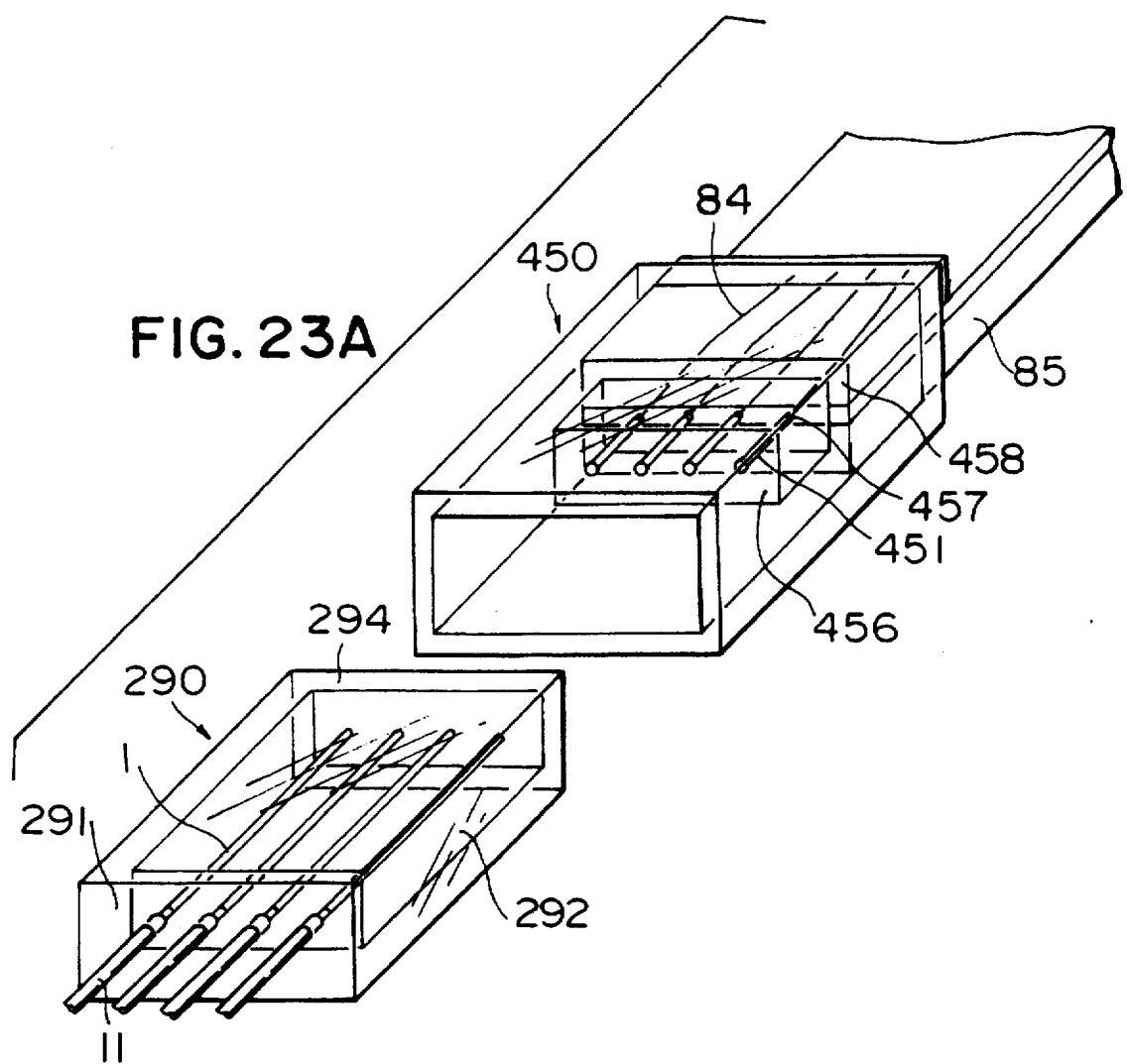
FIGS. 23A and 23B are perspective views showing the structure of the 14th embodiment in the optical connector of the present invention.
Figure 23B:
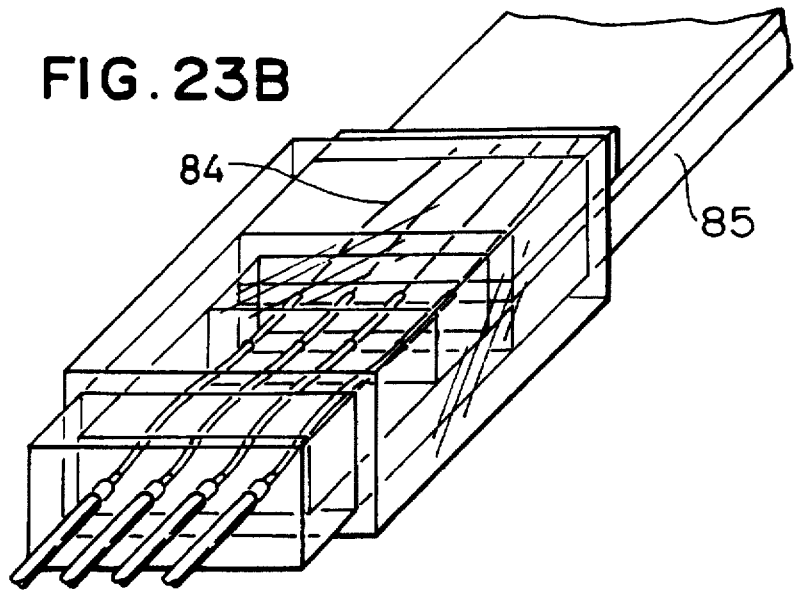

FIGS. 23A and 23B are perspective views showing the structure of the 14th embodiment in the optical connector of the present invention. This connector is for multiple fibers to optically connect together four optical waveguides and optical fibers arranged in the lateral direction, and is constituted based on the 13th embodiment.

In these figures, reference numeral 1 represents an optical fibers, 11 represents coating of the optical fibers, 290 represents a plug, 291 represents an optical fiber-holding portion, 292 represents an optical fiber-buckling portion, 294 represents a tip face of the plug, 450 represents a jack, 84 represents optical waveguides, 85 represents an optical waveguide substrate, 458 represents a glass block, 457 represents an optical waveguide end face including end face portions of optical waveguide substrate 85 and glass block 458, 456 represents an optical fiber guide, and 451 represents alignment holes. FIGS. 23A and 23B show the states before and after plug 290 is fitted to jack 450, respectively. Note that, in FIG. 23B, a clip corresponding to the clip 83 in FIG. 20 for fitting plug 290 and jack 450 is not shown.

Optical fiber 1 protrudes from the tip face 294 of the plug by the length corresponding to ΔL shown in the 13th embodiment. When plug 290 is fitted to jack 450 and fixed, corresponding optical fibers 1 are inserted to corresponding alignment holes 451, run against the optical waveguide end face 457, and buckle and bend. Therefore, optical connection having high density, small insertion loss in respective fibers, and large return loss can be realized.

As a method to constitute the fiber guide 456, there can be considered a structure in which fiber guides for a single fiber having only one alignment hole in the same parts are arranged separately in plural numbers, respectively, for the position corresponding to the optical waveguides, and a structure in which fiber guides for multiple fibers having plural optical fibers and alignment holes in the same parts are arranged. As a fiber guide for a single fiber, there can be mentioned a microtube, molding parts and the like, and as a fiber guide for multiple fibers, there can be mentioned the one in which plural microtubes are combined and fixed, molding parts, V groove array substrate and the like. In the case of molding parts, there can be mentioned fine tubes of cylindrical shape or V groove shape as the optical fiber-inserting hole. As the V groove array substrate, there can be mentioned the one in which Si substrate is subjected to the anisotropic etching, the one in which glass substrate is machined, or the like.

Figure 24:
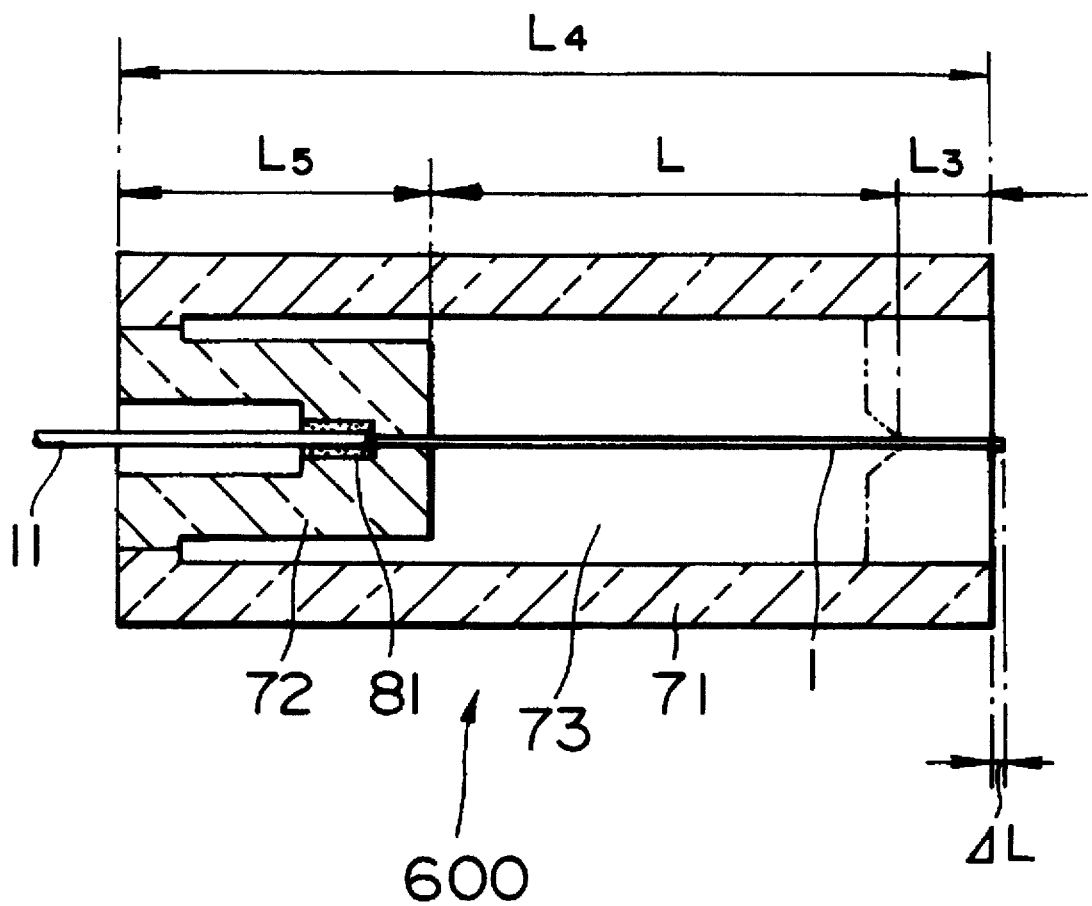
FIG. 24 is a sectional view showing the structure of the plug used in the 15th embodiment in the optical connector of the present invention.

FIG. 24 is a sectional view showing the structure of the plug used in the 15th embodiment in the optical connector of the present invention. The plug 600 shown in this figure is inserted to jack 430 shown in FIG. 15A to constitute the optical fiber connector, and substitutes the plug 230 in FIG. 15A.

The plug 600 shown in FIG. 24 is provided with an outside cylindrical portion 71 which is hollow and has a large diameter outside thereof, and to this outside cylindrical portion 71 is inserted an inside cylindrical portion 72 having small diameter, and both of them are joined together at the rear end portion which is one end portion to be integrated. In the inside cylindrical portion 72 having small diameter arranged inside, a hollow portion is formed in said rear end side, and the front end portion opposite to said rear end portion is formed in a solid state. An optical fiber 1 passes through the center of this solid front end portion. The optical fiber 1 is adhered in the portion to the rear of the solid front end portion of this inside cylindrical portion 72 from over the coating 11 by the adhesive 81.

The hollow portion of the front end portion in the outside cylindrical portion 71 constitutes a buckling portion 73 corresponding to the bending space of the optical fiber 1, and in this buckling portion 73, the fitting portion in which an optical fiber alignment hole 431 is formed projecting inside of the jack 430 shown in FIG. 15A is fitted as shown by a dotted line. And, in the case where the buckling portion 73 of plug 600 is inserted to the fitting portion of jack 430, the front end portion of the outside cylindrical portion 71 of plug 600 runs against the plug-confronting face 434 of jack 430 and is stopped.

The length of the outside cylindrical portion 71 of plug 600 is $L_4$ as shown in the drawing, and the length of the inside cylindrical portion 72 is $L_5$. As described above, when the fitting portion of jack 430 is fitted, the length from the front end portion of the outside cylindrical portion 71 to the bottom of the taper for inserting the optical fiber at the tip of the fitting portion of jack 430 is $L_3$. The length subtracting the length $L_5$ of the inside cylindrical portion 72 and said $L_3$ from the whole length $L_4$ of the outside cylindrical portion 71, that is, the length from the tip of the inside cylindrical portion 72 to the bottom of the taper for inserting the optical fiber is defined as L.

Furthermore, the optical fiber 1 inserted into plug 600 and fixed in the solid front end portion of the inside cylindrical portion 72 extends from the front end portion, through the hollow buckling portion 73 by a slight length, that is, predetermined protruding length ΔL.

As described above, when the fitting portion of jack 430 is fitted to the buckling portion 73 of plug 600, and the front end portion of the outside cylindrical portion 71 of plug 600 is inserted until it runs against the plug-confronting face 434 of jack 430, the tip of the optical fiber 1 in plug 600 is brought into surface contact with the tip of the optical fiber 1 in the alignment hole 431 of jack 430, and the optical fiber 1 bends and curves in the buckling portion 73 due to the protruding length ΔL, thereby both optical fibers 1 are securely connected.

The plug 600 shown in FIG. 24 is so constituted as to have the following relations between the outside cylindrical portion 71 and the inside cylindrical portion 72, assuming that the linear expansion ratio of the outside cylindrical portion 71 is $\alpha_1$, and the linear expansion ratio of the inside cylindrical portion 72 is $\alpha_2$:

$$L_4\alpha_1 = L_5\alpha_2$$

Namely, the outside cylindrical portion 71 and the inside cylindrical portion 72 are so constituted that the length of expansion due to thermal expansion is the same.

Therefore, when the fitting portion of jack 430 in FIG. 15A is inserted into the buckling portion 73 of plug 600, and plug 600 and jack 430 are fitted as described above, the length of optical fiber 1 necessary for the optical fiber 1 of plug 600 to buckle in the buckling portion 73 is $L_4-L_5$, but this buckling length $L_4-L_5$ does not change, even if the environmental temperature changes by ΔT, thereby the lengths of the outside cylindrical portion 71 and the inside cylindrical portion 72 change, respectively, from $L_4$ and $L_5$ to $L_4+\alpha_1 L_4 \Delta T$ and $L_5+\alpha_2 L_5 \Delta T$, since $L_4\alpha_1=L_5\alpha_2$. Namely, since the buckling length $L_4-L_5$ of the optical fiber 1 is always constant, said protruding length ΔL of the optical fiber 1 does not change, thereby the optical fiber 1 always buckles similarly, and can maintain stable connection state with respect to the temperature change.

Lastly, the embodiment which includes a structure for preventing breaking, cracking and the like as the buckling volume increases will be described.

FIGS. 25A and 25B are views showing the 16th embodiment in the optical connector of the present invention. In the present embodiment, the UV coating material 11 of the optical fiber 1 is removed in the portion inserted into the sleeve 91 and in the holding portion to hold the optical fiber certainly.

Figures 26A, 26B:
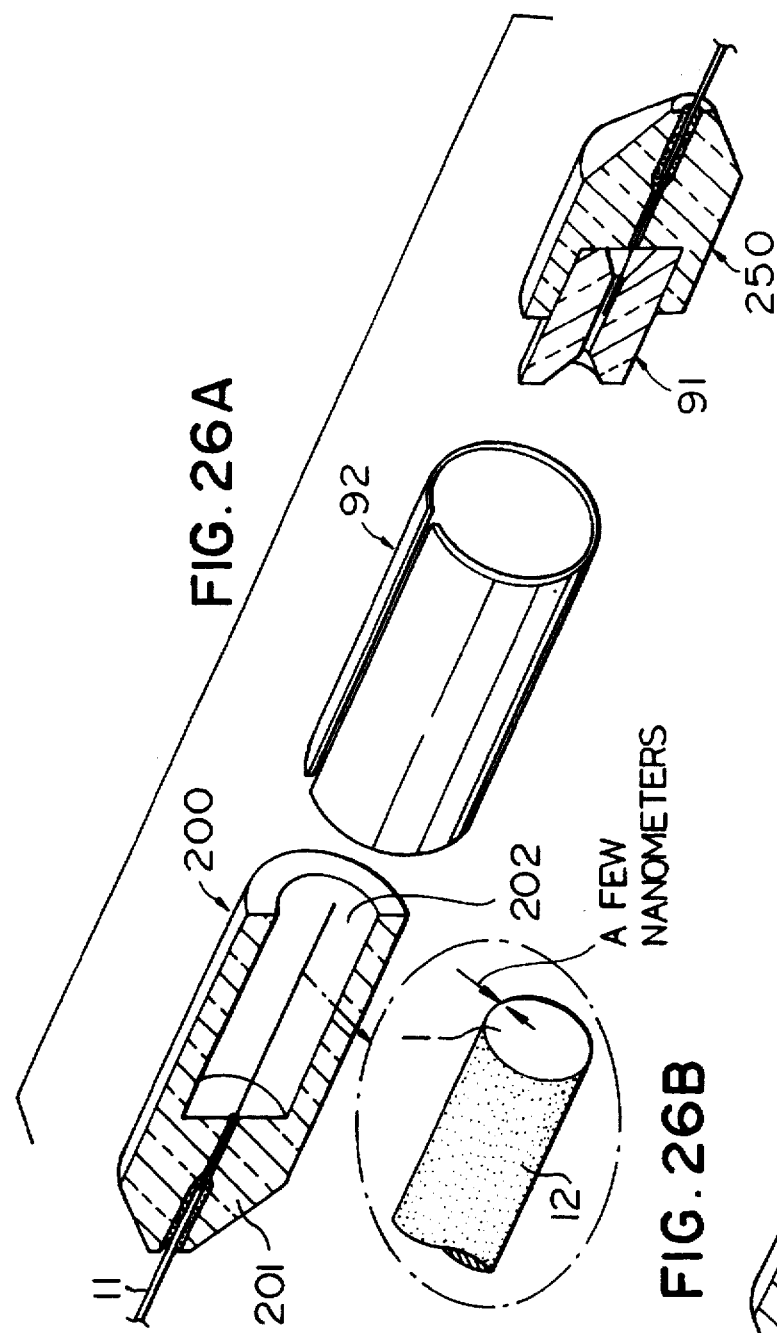
FIGS. 26A and 26B are views showing the structure of the 17th embodiment in the optical connector of the present invention.

FIGS. 26A and 26B are views showing the 17th embodiment in the optical connector of the present invention. In the present embodiment, as the coating material of the optical fiber 1, there is used a carbon coating material 12 coated in a thickness of about several tens nanometers, and this carbon coating material 12 is inserted into the sleeve 91 without being removed.

Figure 27:
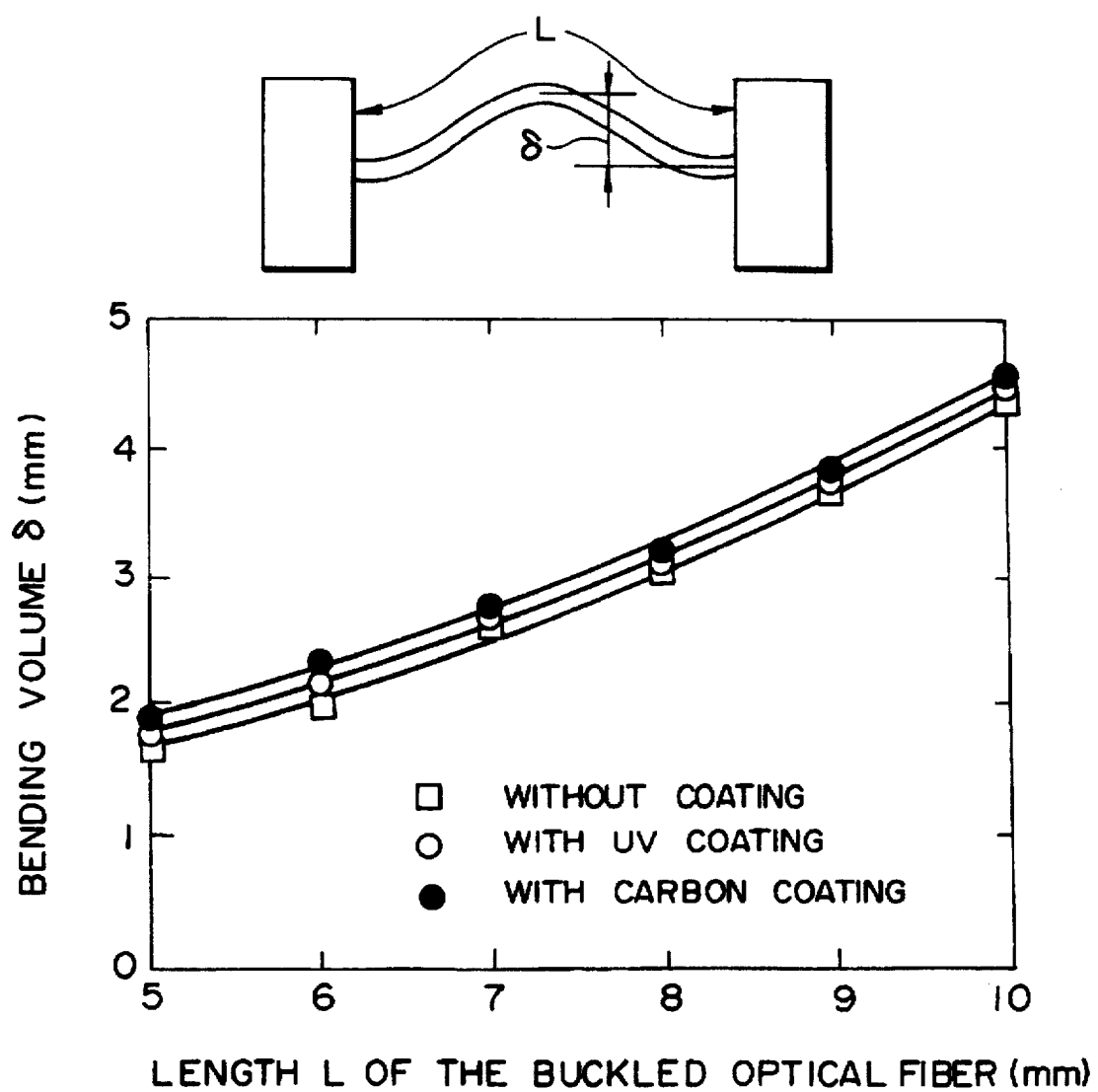
FIG. 27 is a view showing the result of breaking test with respect to the 16th and 17th embodiments.
Figure 28:
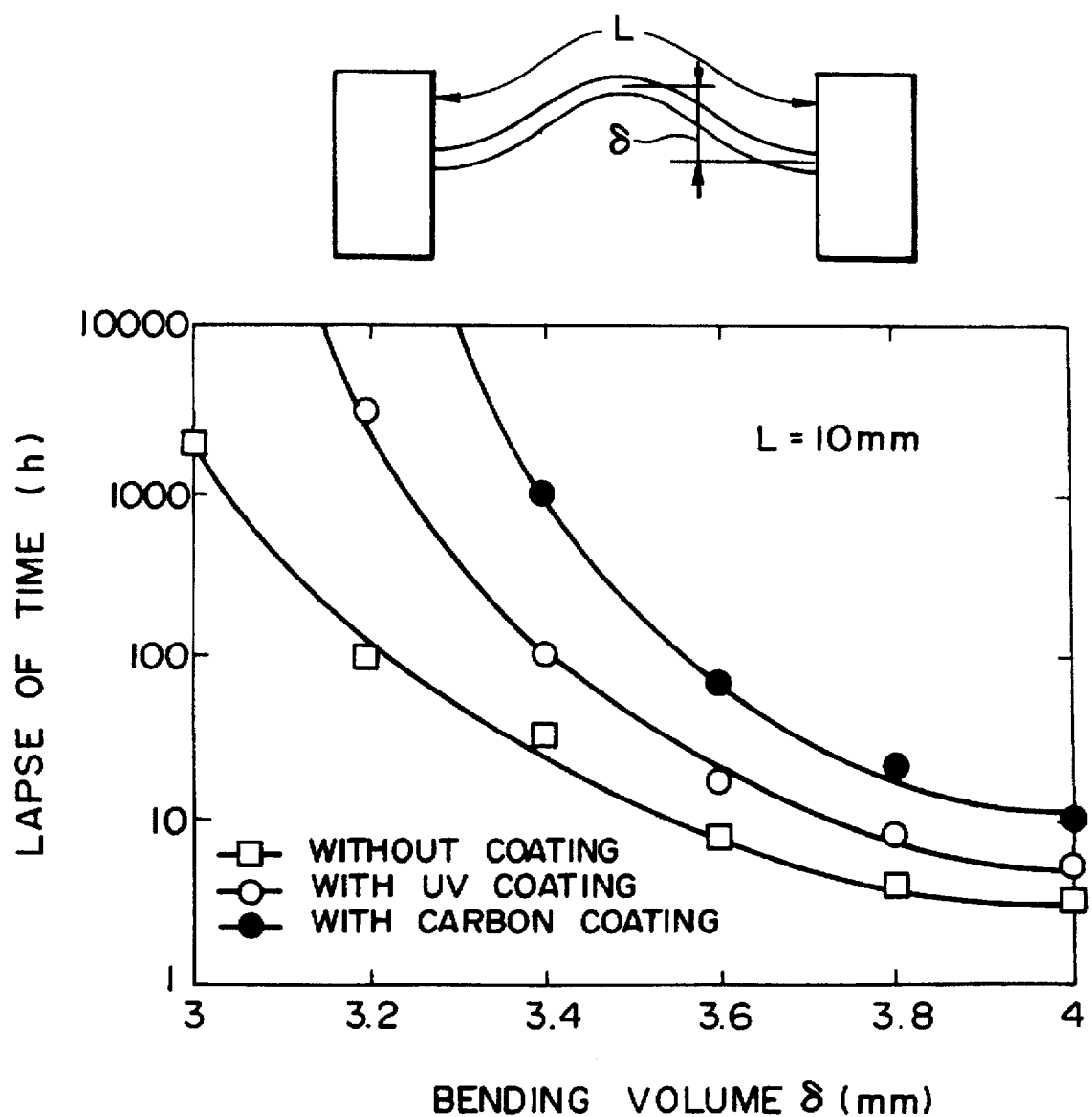
FIG. 28 is a view showing the result of accelerated deteriorating test with respect to the 16th and 17th embodiments.

In order to compare the breaking strength and the long term reliability of the optical fiber 1 according to the 16th and 17th embodiments with those of an embodiment without such contrivances, breaking test and accelerated deteriorating test were conducted. The result of the breaking test is shown in FIG. 27, and the result of the accelerated deteriorating test is shown in FIG. 28. In FIG. 27, the bending volume when an optical fiber 1 having a length of L is buckled and broken is expressed by δ, and in FIG. 28, when the optical fiber 1 having a length of L (10 mm) is buckled and assuming that the bending volume is δ, the lapse of time required until the optical fiber is broken is shown. In FIGS. 27 and 28, "□" shows the optical fiber having no coating material in the buckling portion, "○" shows the optical fiber having an UV coating material 11 in the buckling portion (the 16th embodiment), and "0" shows the optical fiber coated with carbon (the 17th embodiment).

As is obvious from the result of breaking test shown in FIG. 27, it is understood that the optical fibers according to the 16th embodiment and the 17th embodiment are not broken even if the bending volume δ is somewhat larger than the one of the first to the 15th embodiments. Furthermore, as is obvious from the result of accelerated deteriorating test shown in FIG. 28, it is understood that in the optical fibers according to the 16th embodiment and the 17th embodiment, the lapse of time required until the fiber is broken becomes longer than that of the first to the 15th embodiments.

Thus, according to the 16th and 17th embodiments, the breaking strength and the reliability are improved, whereby the occurrence of crack on the surface of the optical fiber and the growth of the crack can be suppressed, as well as the deterioration of strength can be suppressed.

Note that, in the 17th embodiment, optical fiber 1 coated with carbon is used and it is connected without removing this coating material 12, but this optical fiber 1 may be further coated with the UV coating material 11 according to the 16th embodiment over the surface of the carbon coating material 12, and only the portion inserted into the sleeve 91 of this UV coating material 11 may be removed as in the 16th embodiment. Thereby, the buckling portion of the optical fiber 1 is protected doubly, and the deterioration of strength can be further suppressed.

As described above, in the 16th embodiment, the buckling portion is coated with the UV coating material 11, and in the 17th embodiment, the buckling portion is coated with the carbon coating material 12, to suppress the deterioration of strength. However, even if the coating of the buckling portion of the optical fiber 1 is removed as in the 1st to the 15th embodiments, if another coating material is used on the portion where the coating is removed as described below, the similar effects can be obtained as in the 16th embodiment and the 17th embodiment.

Specifically, as the 18th embodiment, there is described a method that the portion where the coating material is removed is plated with another coating material by the nonelectrode plating method. As this nonelectrode plating method, the coating-removed portion is immersed into a solution combined with, for example, silver nitrate solution and tartaric acid, ammonia, or formaldehyde, and it is coated with a reduced and deposited silver. Instead of that, gold coating or silver coating may be applied. According to this embodiment, occurrence of cracks of the optical fiber 1 can be suppressed by this silver coating or the like.

A method to form another coating material by the hydrolysis method will be described as the 19th embodiment. In this embodiment, the optical fiber is immersed into the alcohol solution of $TiCl_2(OC_2H_5)_2$, left in the air to form the hydrolytic film on the coating-removed portion, then heated in the air to form the $TiO_2$ film. As the other example, a complex film such as $SiO_2$—$TiO_2$, $SiO_2$—$Al_2O_3$, $SiO_2$—$ZrO_2$ or the like is formed by effecting hydrolysis using a mixture of silica acid ethyl and various metal isopropoxy. According to this embodiment, occurrence of cracks and the like can be suppressed by the $TiO_2$ film and the like formed by the hydrolysis.

As the 20th embodiment, a method to form another coating material using an atomizer will be described.

According to this embodiment, the coating-removed portion of the optical fiber 1 is pre-heated, then nonaqueous solution in which Sn compound is dissolved is sprayed thereto by a spray gun (atomizer), decomposed and oxidized by the heat of the tip portion of the optical fiber 1 to form a $SnO_2$ film. Alternatively, butanol solution of acetylacetonate mixed with Fe, In, Cr or V is sprayed with a spray gun, and decomposed and oxidized to form $FeO_3$, $SnO_2$, $InO_3$, $CrO_3$, and $V_2O_3$ films. According to this embodiment, the long term reliability can be improved by these oxide coatings of the $SnO_2$ film and the like similarly as in the 16th and the 17th embodiments.

As the 21st embodiment, a method to form another coating material by the liquid phase deposition will be described. According to this 21st embodiment, so-called F-eater such as aluminum, boric acid and the like is added to hydrosilicofluoric acid in which silicon dioxide is saturated and dissolved to generate a supersaturation condition, and the coating-removed portion of the optical fiber is immersed into this solution, and silicon dioxide is sedimented in the solution to form the $SiO_2$ film. Instead of that, $TiO_2$ film, $V_2O_5$ film or the like may be formed with the similar method. According to this embodiment, the reliability of the optical fiber 1 can be improved by the oxide film such as $TiO_2$ film or the like formed by the liquid phase deposition.

It should be understood that many modifications and adaptations of the invention will become apparent to those skilled in the art and it is intended to encompass such obvious modifications and changes in the scope of the claims appended hereto.

What is claimed is:

1. An optical connector comprising:

two plugs having a cavity with one end being opened, and holding an optical fiber with the end face being shaped as a cantilever at the other end thereof, respectively; and, an alignment member having an alignment hole in the center in the radial direction, and to which said respective optical fibers are inserted from both directions when said two respective plugs are fitted from both directions of said alignment hole; wherein respective tips of two optical fibers related to said two plugs being press-contacted in said alignment hole, and said both two optical fibers, or either of them buckling in said cavity.

2. An optical connector comprising:

a plug having a cavity with one end being opened, and holding an optical fiber with the end face being shaped as a cantilever at the other end thereof; and, a jack having an alignment member at one end having an alignment hole in the center in the radial direction, and holding at the other end an optical fiber with the end face being shaped so that the tip thereof is located in said alignment hole; wherein, the optical fiber related to said plug being inserted into said alignment hole and press-contacted by the optical fiber related to said jack when said plug is fitted to said jack, and said optical fiber related to said plug buckling in said cavity.

3. An optical connector comprising:

a plug having a cavity with one end being opened, and holding an optical fiber with the end face being shaped as a cantilever at the other end thereof; and, a jack having an alignment member at one end having an alignment hole in the center in the radial direction, having a cavity with both ends being closed inside of said alignment member, and holding at the other end an optical fiber with the end face being shaped so that said optical fiber is inserted through the cavity as well as the tip thereof is located in said alignment hole; wherein, the optical fiber related to said plug being inserted into said alignment hole and press-contacted by the optical fiber related to said jack when said plug is fitted to said jack, and both optical fiber related to said plug and optical fiber meshed with said jack or either one of them buckling in said respective cavities.

4. An optical connector comprising:

a plug having a cavity with one end being opened, and holding an optical fiber with the end face being shaped as a cantilever at the other end thereof; and, a jack having an alignment member at one end having an alignment hole in the center in the radial direction, and holding at the other end an optical waveguide so that the end face thereof abuts against said alignment hole; wherein, said optical fiber being inserted into said alignment hole and press-contacted by the end face of said optical waveguide when said plug is fitted to said jack, and said optical fiber related to said plug buckling in said cavity.

5. An optical connector comprising:

two plugs having a cavity with one end being opened, and holding an optical fiber with the end face being shaped as a cantilever at the other end thereof, respectively; and, an adapter having alignment members having an alignment hole in the center in the radial direction, respectively at both ends, having a cavity inside of said two alignment members, and holding an optical fiber with the end face being shaped so that said optical fiber is inserted through the cavity as well as both ends thereof are located in respective alignment holes of said two alignment members; wherein, respective optical fibers related to said two plugs being inserted into said respective alignment holes and press-contacted by the optical fiber related to said adapter when said two plugs are fitted from both directions of said adapter, and said optical fiber related to said adapter buckling in said cavity.

6. An optical connector according to claim 1, wherein said buckling is caused because the relationship of the length of said two optical fibers are such that respective tips of said two optical fibers abut against each other, before said two plugs and said alignment member are fitted to the predetermined final position.

7. An optical connector according to claim 2, wherein said buckling is caused because the relationship of the length of said optical fiber related to said plug and the length of said optical fiber related to said jack are such that respective tips of said two optical fibers abut against each other, before said plug and said jack are fitted to the predetermined final position.

8. An optical connector according to claim 4, wherein said buckling is caused because the relationship between the length of said optical fiber related to said plug and the length of said optical waveguide related to said jack are such that the tip of said optical fiber abuts against the end face of said optical waveguide, before said plug and said jack are fitted to the predetermined final position.

9. An optical connector according to claim 5, wherein said buckling is caused because the relationship of the length of said three optical fibers are such that respective tips of said two optical fibers related to said two plugs abut against the optical fiber related to said adapter, before said two plugs and said adapter are fitted to the predetermined final position.

10. An optical connector according to claim 1, wherein the end face of said optical fiber is flat surface-polished.

11. An optical connector according to claim 1, wherein ripples of the cleaved surface of said optical fiber is removed.

12. An optical connector according to claim 1, wherein cleaved surface of said optical fiber is chamfered.

13. An optical connector according to claim 1, wherein a taper is provided in the entrance portion of said alignment hole.

14. An optical connector according to claim 1, wherein respective aperture end faces of said two plugs are surface-contacted.

15. An optical connector according to claim 1, wherein the aperture end face of one plug agrees with the end face of the fiber related to said plug.

16. An optical connector according to claim 1, wherein the aperture end face of said plug agrees with the end face of the fiber related to said plug.

17. An optical connector according to claim 5, wherein the aperture end face(s) of both or one of said two plugs agrees with the face of the fiber corresponding thereto.

18. An optical connector according to claim 1, further comprising:
an alignment member having an alignment hole through which said optical fiber is inserted, and slidable in the cavity of said plug; and,
an elastic member which pushes said alignment member and locates it to the tip portion of said plug in the steady state.

19. An optical connector according to claim 1, wherein the length of the cavity related to one plug is longer than that of the cavity related to the other plug.

20. An optical connector according to claim 4, wherein said plug comprising:
an outside cylindrical member having the first predetermined length and the first predetermined linear expansion ratio; and,
an inside cylindrical member provided within said outside cylindrical member, having the second predetermined length and the second predetermined linear expansion ratio, the one end thereof being formed integrally with said outside cylindrical member, and having an opening cavity on the one end side, and holding said optical fiber at the other end; wherein,
the product of said first predetermined length and said first predetermined linear expansion ratio is equal to the product of said second predetermined length and the second predetermined linear expansion ratio.

21. An optical connector according to claim 1, wherein said two plugs have plural optical fibers, respectively, and said alignment holes exist in the same number corresponding thereto.

22. An optical connector according to claim 2, wherein said plug and said jack have plural optical fibers, and said alignment holes exist in the same number corresponding thereto.

23. An optical connector according to claim 4, wherein said plug and said jack have plural optical fibers and optical waveguides, respectively, and said alignment holes exist in the same number corresponding thereto.

24. An optical connector according to claim 5, wherein said two plugs have plural optical fibers, respectively, and said adapter has the same number of alignment holes and optical fibers corresponding thereto.

25. An optical connector according to claim 1, wherein the coating on the optical fiber portion related to said buckling is left.

26. An optical connector according to claim 1, wherein the portion related to buckling of said optical fiber is coated with carbon.

27. An optical connector according to claim 1, wherein the portion related to buckling of said optical fiber is coated with a metal film formed by nonelectrode plating.

28. An optical connector according to claim 1, wherein the portion related to buckling of said optical fiber is coated with an oxide film of an organometallic compound formed by heating a hydrolytic film of an organometallic compound.

29. An optical connector according to claim 1, wherein the portion related to buckling of said optical fiber is coated with an oxide film of an organometallic compound formed by heating a sprayed organometallic compound.

30. An optical connector according to claim 1, wherein the portion related to buckling of said optical fiber is coated with an oxide film of an organometallic compound formed by the liquid-phase deposition.

31. An optical connector according to claim 1, wherein said two plugs and said alignment member are fixed with a fixing member.

32. An optical connector according to claim 31, wherein said fixing member is a cylindrical elastic body having a split, and said two plugs and said alignment member are inserted thereto to enlarge said split portion, thereby said two plugs and said alignment member are fixed.

33. An optical connector according to claim 31, wherein said fixing member has pawls, and pawls and the central portion thereof are connected by plates having different length, pawls being open in the state that the longer plate bends toward inside, and pawls being closed in the state that it bends toward outside.

34. An optical connector according to claim 2, wherein said plug and said jack are fixed with a fixing member.

35. An optical connector according to claim 34, wherein said fixing member is a cylindrical elastic body having a split, and said plug and said alignment member are inserted thereto to enlarge said split portion, thereby said plug and said alignment member are fixed.

36. An optical connector according to claim 34, wherein said fixing member has pawls, and pawls and the central portion thereof are connected by plates having different length, pawls being open in the state that the longer plate bends toward inside, and pawls being closed in the state that it bends toward outside.

37. An optical connector according to claim 5, wherein said two plugs and said adapter are fixed with a fixing member.

38. An optical connector according to claim 37, wherein said fixing member is a cylindrical elastic body having a split, and said two plugs and said alignment member are inserted thereto to enlarge said split portion, thereby said two plugs and said alignment member are fixed.

39. An optical connector according to claim 37, wherein said fixing member has pawls, and pawls and the central portion thereof are connected by plates having different length, pawls being open in the state that the longer plate bends toward inside, and pawls being closed in the state that it bends toward outside.

40. An optical connector according to claim 1, wherein the material of said plug is glass.

41. An optical connector according to claim 1, wherein the material of said plug is crystallized glass.

42. An optical connector according to claim 1, wherein the material of said plug is liquid crystal polymer.

* * * * *